(12) United States Patent
Fujita

(10) Patent No.: US 7,844,140 B2
(45) Date of Patent: Nov. 30, 2010

(54) IMAGE PROCESSING APPARATUS, IMAGE PROCESSING METHOD, AND SERVER AND CONTROL METHOD OF THE SAME

(75) Inventor: Shunji Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 939 days.

(21) Appl. No.: 11/674,187

(22) Filed: Feb. 13, 2007

(65) Prior Publication Data

US 2007/0201767 A1 Aug. 30, 2007

(30) Foreign Application Priority Data

| Feb. 24, 2006 | (JP) | ............................. 2006-048971 |
| Dec. 27, 2006 | (JP) | ............................. 2006-353182 |

(51) Int. Cl.
*G06K 9/54* (2006.01)
(52) U.S. Cl. ................. 382/305; 348/211.3; 348/222.1; 348/231.2; 348/231.99; 709/203; 709/219
(58) Field of Classification Search .............. 348/211.3; 382/305; 707/102, E17.002, E17.004, E17.019, 707/E17.02, E17.023; 709/203, FOR. 106; 715/233, 744, FOR. 185
See application file for complete search history.

(56) References Cited

U.S. PATENT DOCUMENTS

| 7,124,427 | B1 * | 10/2006 | Esbensen .................... 725/109 |
| 7,225,414 | B1 * | 5/2007 | Sharma et al. .............. 715/863 |
| 2004/0153445 | A1 * | 8/2004 | Horvitz et al. ................. 707/3 |
| 2006/0190285 | A1 * | 8/2006 | Harris et al. .................... 705/1 |
| 2007/0255701 | A1 * | 11/2007 | Halla et al. ..................... 707/5 |

FOREIGN PATENT DOCUMENTS

| EP | 1710717 A | 10/2006 |
| JP | 10-232934 | 9/1998 |
| JP | 2000-048184 | 2/2000 |
| JP | 2001-036786 | 2/2001 |
| WO | 2005-073879 A | 8/2005 |

OTHER PUBLICATIONS

The above reference were cited in on Sep. 5, 2008 Chinese Office Action that issued in Chinese Patent Application 200710080168.8, which is enclosed with English Translation.

* cited by examiner

*Primary Examiner*—Sath V Perungavoor
*Assistant Examiner*—Gregory F Cunningham
(74) *Attorney, Agent, or Firm*—Cowan, Liebowitz & Latman, P.C.

(57) ABSTRACT

An image processing apparatus includes a generating unit for generating a database related to image data acquired by image sensing, a transmitting unit for transmitting image data to a server, a receiving unit for receiving characteristic data of the image data from the server, the characteristic data being based on the result of at least person extraction performed on the image data, a recording unit for recording, on a recording medium, the characteristic data related to the image data and received from the server as a part of the database generated by the generating unit, a searching unit for presenting the characteristic data such that the characteristic data can be designated, and searching the database so as to hit image data corresponding to the designated characteristic data, and a display unit for displaying images based on the image data hit by the searching unit.

14 Claims, 24 Drawing Sheets

FIG. 2

| 201 | 202 | 203 | 204 | 205 | 206 | 207 | 208 |
|---|---|---|---|---|---|---|---|
| ID | FLAG | PATH | TYPE | PHOTOGRAPHING DATE/TIME | PERSON/ LANDSCAPE | COLOR | WEATHER |
| 00000001 | 1 | /DCIM/100ABCDE/IMG_0001.JPG | STILL IMAGE | 2005/01/23 11:03 | LANDSCAPE | GREEN, WHITE | CLOUDY |
| 00000002 | 1 | /DCIM/100ABCDE/IMG_0002.JPG | STILL IMAGE | 2005/01/23 13:21 | PERSON | YELLOW, WHITE | CLOUDY |
| 00000003 | 1 | /DCIM/100ABCDE/IMG_0003.JPG | STILL IMAGE | 2005/02/01 09:38 | PERSON | BLUE, RED | CLEAR |
| 00000004 | 1 | /DCIM/100ABCDE/MOV_0001.MPG | MOTION IMAGE | 2005/02/01 09:52 | PERSON | BLUE, RED, WHITE | CLEAR |
| 00000005 | 1 | /DCIM/100ABCDE/IMG_0004.JPG | STILL IMAGE | 2005/02/01 20:04 | LANDSCAPE | GREEN | CLEAR |
| 00000006 | 1 | /DCIM/100ABCDE/IMG_0005.JPG | STILL IMAGE | 2005/02/01 22:12 | PERSON | NAVY BLUE, YELLOW | CLEAR |

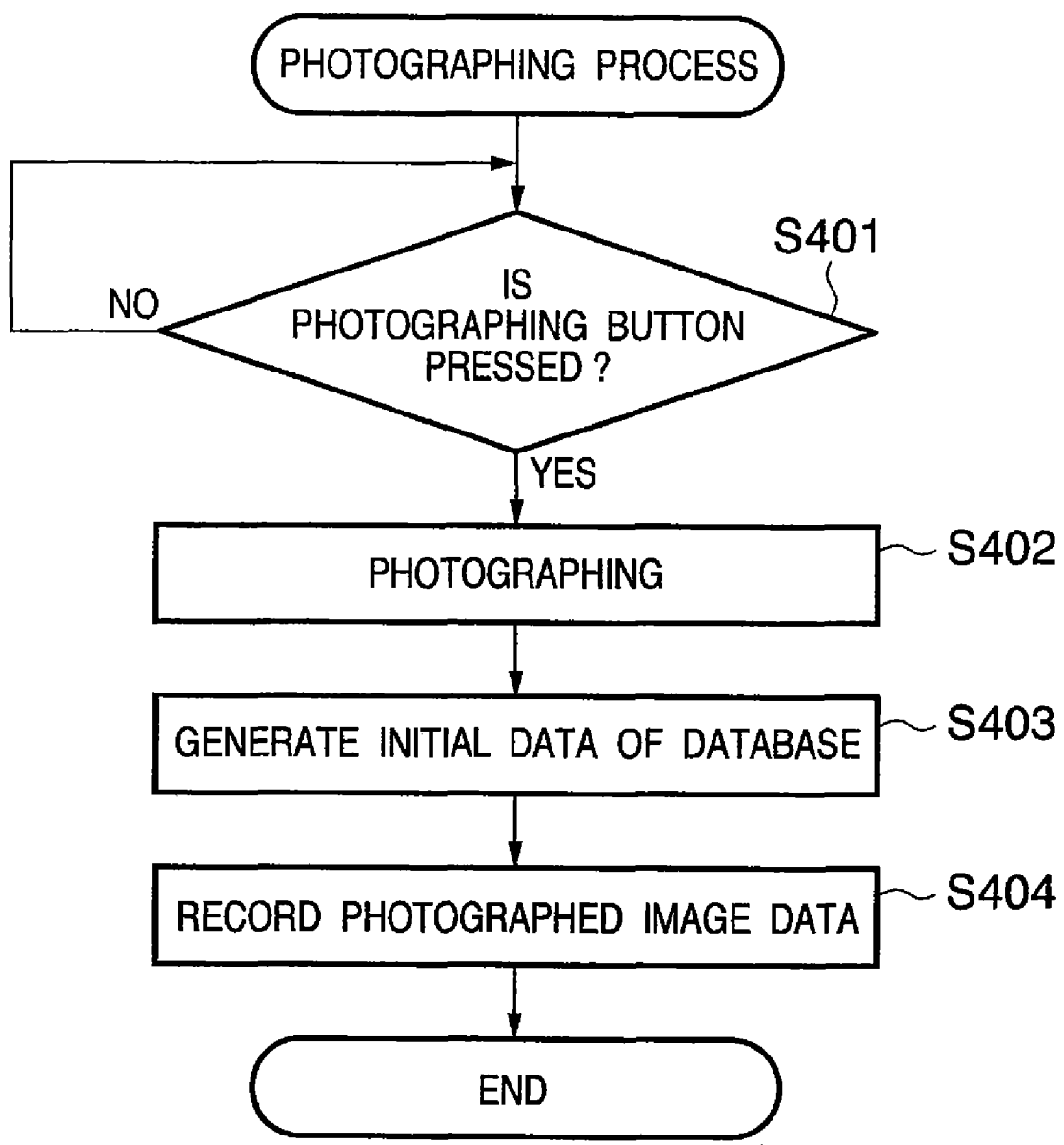

FIG. 5

| ID | FLAG | PATH | TYPE | PHOTOGRAPHING DATE / TIME | PERSON / LANDSCAPE | COLOR | WEATHER |
|---|---|---|---|---|---|---|---|
| 00000001 | 1 | /DCIM/100ABCDE/IMG_0001.JPG | STILL IMAGE | 2005/01/23 11:03 | LANDSCAPE | GREEN, WHITE | CLOUDY |
| 00000002 | 1 | /DCIM/100ABCDE/IMG_0002.JPG | STILL IMAGE | 2005/01/23 13:21 | PERSON | YELLOW, WHITE | CLOUDY |
| 00000003 | 1 | /DCIM/100ABCDE/IMG_0003.JPG | STILL IMAGE | 2005/02/01 09:38 | PERSON | BLUE, RED | CLEAR |
| 00000004 | 1 | /DCIM/100ABCDE/MOV_0001.MPG | MOTION IMAGE | 2005/02/01 09:52 | PERSON | BLUE, RED, WHITE | CLEAR |
| 00000005 | 1 | /DCIM/100ABCDE/IMG_0004.JPG | STILL IMAGE | 2005/02/01 20:04 | LANDSCAPE | GREEN | CLEAR |
| 00000006 | 1 | /DCIM/100ABCDE/IMG_0005.JPG | STILL IMAGE | 2005/02/01 22:12 | PERSON | NAVY BLUE, YELLOW | CLEAR |
| 00000007 | 0 | /DCIM/100ABCDE/MOV_0002.MPG | MOTION IMAGE | 2005/03/07 14:10 | — | — | — |
| 00000008 | 0 | /DCIM/100ABCDE/IMG_0006.JPG | STILL IMAGE | 2005/03/07 14:45 | — | — | — |
| 00000009 | 0 | /DCIM/100ABCDE/IMG_0007.JPG | STILL IMAGE | 2005/03/07 15:29 | — | — | — |

FIG. 8

| ID | PERSON / LANDSCAPE | COLOR | WEATHER |
|---|---|---|---|
| 00000007 | PERSON | WHITE, YELLOW, PINK, BLUE | CLEAR |
| 00000008 | PERSON | PINK, BLUE | CLEAR |
| 00000009 | PERSON | PINK, BLUE | CLEAR |

| ID | FLAG | PATH | TYPE | PHOTOGRAPHING DATE / TIME | PERSON / LANDSCAPE | COLOR | WEATHER |
|---|---|---|---|---|---|---|---|
| 00000001 | 1 | /DCIM/100ABCDE/IMG_0001.JPG | STILL IMAGE | 2005/01/23 11:03 | LANDSCAPE | GREEN, WHITE | CLOUDY |
| 00000002 | 1 | /DCIM/100ABCDE/IMG_0002.JPG | STILL IMAGE | 2005/01/23 13:21 | PERSON | YELLOW, WHITE | CLOUDY |
| 00000003 | 1 | /DCIM/100ABCDE/IMG_0003.JPG | STILL IMAGE | 2005/02/01 09:38 | PERSON | BLUE, RED | CLEAR |
| 00000004 | 1 | /DCIM/100ABCDE/MOV_0001.MPG | MOTION IMAGE | 2005/02/01 09:52 | PERSON | BLUE, RED, WHITE | CLEAR |
| 00000005 | 1 | /DCIM/100ABCDE/IMG_0004.JPG | STILL IMAGE | 2005/02/01 20:04 | LANDSCAPE | GREEN | CLEAR |
| 00000006 | 1 | /DCIM/100ABCDE/IMG_0005.JPG | STILL IMAGE | 2005/02/01 22:12 | PERSON | NAVY BLUE, YELLOW | CLEAR |
| 00000007 | 1 | /DCIM/100ABCDE/MOV_0002.MPG | MOTION IMAGE | 2005/03/07 14:10 | PERSON | WHITE, YELLOW, PINK, BLUE | CLEAR |
| 00000008 | 1 | /DCIM/100ABCDE/IMG_0006.JPG | STILL IMAGE | 2005/03/07 14:45 | PERSON | PINK, BLUE | CLEAR |
| 00000009 | 1 | /DCIM/100ABCDE/IMG_0007.JPG | STILL IMAGE | 2005/03/07 15:29 | PERSON | PINK, BLUE | CLEAR |

FIG. 13

| 201 | 202 | 203 | 204 | 205 | 206 | 207 | 208 | 1301 | 1302 | 1303 |
|---|---|---|---|---|---|---|---|---|---|---|
| ID | FLAG | PATH | TYPE | PHOTO-GRAPHING DATE / TIME | PERSON /LAND-SCAPE | COLOR | WEATHER | NUMBER OF PERSONS | PERSON ID | SEARCH KEY IMAGE |
| 00000010 | 0 | /DCIM/100ABCDE/IMG_0008.JPG | STILL IMAGE | 2005/03/08 19:38 | — | — | — | — | — | — |
| 00000011 | 0 | /DCIM/100ABCDE/IMG_0009.JPG | STILL IMAGE | 2005/03/17 10:03 | — | — | — | — | — | — |
| 00000012 | 0 | /DCIM/100ABCDE/IMG_0010.JPG | STILL IMAGE | 2005/03/17 10:16 | — | — | — | — | — | — |

FIG. 15

| ID 801 | PERSON/LANDSCAPE 802 | COLOR 803 | WEATHER 804 | NUMBER OF PERSONS 1501 | PERSON ID 1502 | SEARCH KEY IMAGE 1503 |
|---|---|---|---|---|---|---|
| 00000010 | PERSON | WHITE, YELLOW, PINK, BLUE | CLEAR | 2 | A, B | A.jpg, B.jpg |
| 00000011 | PERSON | PINK, BLUE | CLEAR | 3 | B, C, D | B.jpg, C.jpg, D.jpg |
| 00000012 | PERSON | PINK, BLUE | CLEAR | 1 | C | C.jpg |

FIG. 17

| ID | FLAG | PATH | TYPE | PHOTO-GRAPHING DATE/TIME | PERSON /LAND-SCAPE | COLOR | WEATH-ER | NUMBER OF PERSONS | PERSON ID | SEARCH KEY IMAGE |
|---|---|---|---|---|---|---|---|---|---|---|
| 00000010 | 1 | /DCIM/100ABCDE/IMG_0008.JPG | STILL IMAGE | 2005/03/08 19:38 | PERSON | WHITE, YELLOW, PINK, BLUE | CLEAR | 2 | A, B | A.jpg, B.jpg |
| 00000011 | 1 | /DCIM/100ABCDE/IMG_0009.JPG | STILL IMAGE | 2005/03/17 10:03 | PERSON | PINK, BLUE | CLEAR | 3 | B, C, D | B.jpg, C.jpg, D.jpg |
| 00000012 | 1 | /DCIM/100ABCDE/IMG_0010.JPG | STILL IMAGE | 2005/03/17 10:16 | PERSON | PINK, BLUE | CLEAR | 1 | C | C.jpg |

IMAGE PROCESSING APPARATUS, IMAGE PROCESSING METHOD, AND SERVER AND CONTROL METHOD OF THE SAME

BACKGROUND OF THE INVENTION

1. Field of the Invention

The present invention relates to a technique which searches a recording medium for a desired image and displays the image.

2. Description of the Related Art

In recent digital cameras, the image quality, i.e., the number of pixels forming image data is significantly increasing as the degree of integration of a CCD increases, and the data amount per image data is increasing accordingly. Also, memory cards having nonvolatile flash memory are most often used as recording media in present digital cameras. Since the recording capacities of the present memory cards are limited, memory cards having larger capacities are developed one after another. In addition, the digital camera having, instead of a memory card, a hard disk drive or magnetooptical disk drive capable of recording image data such as a motion image having a large volume is proposed (e.g., Japanese Patent Laid-Open No. 2001-036786).

Unfortunately, when a user wants to reproduce image data recorded on the large-capacity recording medium described above on the display screen of the main body of the digital camera having the recording medium, it takes a long time to find desired image data because the number of image data is huge.

Also, the conventional digital cameras have a function of displaying one image on the display screen, and an index display function of simultaneously displaying a plurality of reduced images on the display screen. Even when the index display function is used, however, the number of images which can be displayed on the display screen is at most about 10. Therefore, finding a desired image from, e.g., 10,000 or more recorded images is not easy and very time-consuming for the user.

SUMMARY OF THE INVENTION

The present invention has been made in consideration of the above situation, and has as its object to implement a technique capable of increasing the search speed when searching a recording medium for a desired image and displaying the image.

In order to achieve the above object, according to the present invention, there is provided an image processing apparatus comprising:

a generating unit adapted to generate a database related to image data acquired by image sensing;

a transmitting unit adapted to transmit the image data to a server;

a receiving unit adapted to receive characteristic data of the image data from the server, the characteristic data being based on a result of at least person extraction performed on the image data;

a recording unit adapted to record, on a recording medium, the characteristic data related to the image data and received from the server as a part of the database generated by the generating unit;

a searching unit adapted to present the characteristic data such that the characteristic data can be designated, and search the database so as to hit image data corresponding to the designated characteristic data; and a display unit adapted to display images based on the image data hit by the searching unit.

There is also provided a server comprising:

a receiving unit adapted to receive image data from an image processing apparatus;

an image analyzing unit adapted to extract characteristic data by performing at least person extraction on the image data;

a recording unit adapted to record the image data and the characteristic data related to the image data on a recording medium; and a transmitting unit adapted to transmit the characteristic data to the image processing apparatus as data for searching for an image database included in the image processing apparatus.

There is also provided an image processing method comprising:

a generating step of generating a database related to image data acquired by image sensing;

a transmitting step of transmitting image data to a server;

a receiving step of receiving characteristic data of the image data from the server, the characteristic data being based on a result of at least person extraction performed on the image data;

a recording step of recording, on a recording medium, the characteristic data related to the image data and received from the server as a part of the database generated by the generating step;

a searching step of presenting the characteristic data such that the characteristic data can be designated, and searching the database so as to hit image data corresponding to the designated characteristic data; and a display step of displaying images based on the image data hit by the searching step.

There is also provided a control method of a server which communicates with an image processing apparatus, comprising:

a receiving step of receiving image data from the image processing apparatus;

an image analyzing step of extracting characteristic data by performing at least person extraction on the image data;

a recording step of recording the image data and the characteristic data related to the image data on a recording medium; and a transmitting step of transmitting the characteristic data to the image processing apparatus as data for searching for an image database included in the image processing apparatus.

There is also provided an image processing apparatus comprising:

a generating unit adapted to generate a database related to image data;

a transmitting unit adapted to selectively transmit the image data to a server according to status of the database about the image data;

a receiving unit adapted to receive characteristic data generated by an analysis of the image data from the server;

a recording unit adapted to record the characteristic data received from the server as a part of the database;

a searching unit adapted to present the characteristic data such that the characteristic data can be designated, and search the database so as to hit image data corresponding to the designated characteristic data; and a reproduction unit adapted to reproduce images based on the image data hit by the searching unit.

There is also provided an image processing method comprising:

a generating step of generating a database related to image data;

a transmitting step of selectively transmitting the image data to a server according to status of the database about the image data;

a receiving step of receiving characteristic data generated by an analysis of the image data from the server;

a recording step of recording the characteristic data received from the server as a part of the database;

a searching step of presenting the characteristic data such that the characteristic data can be designated, and searching the database so as to hit image data corresponding to the designated characteristic data; and a reproduction step of reproducing images based on the image data hit in the searching step.

The present invention makes it possible to rapidly search a recording medium for a desired image and display the image, and reduce the processing load on the image processing apparatus by causing the server to generate characteristic data to be extracted from an image.

Further features of the present invention will become apparent from the following description of exemplary embodiments with reference to the attached drawings.

BRIEF DESCRIPTION OF THE DRAWINGS

FIG. 2 is a view showing the configuration of a database of the first embodiment according to the present invention;

FIG. 4 is a flowchart showing a photographing process performed by the digital camera of the first embodiment;

FIG. 5 is a view showing the configuration of a database to which initial data is added in the first embodiment;

FIG. 8 is a view showing the configuration of meta data returned from the server of the first embodiment;

FIG. 10 is a view showing the configuration of a database to which the meta data is added in the first embodiment;

FIG. 13 is a view showing the configuration of a database of the second embodiment;

FIG. 15 is a view showing the configuration of meta data returned from the server of the second embodiment;

FIG. 17 is a view showing the configuration of a database to which the meta data is added in the second embodiment;

Further features of the present invention will become apparent from the following description of exemplary embodiments (with reference to the attached drawings).

DESCRIPTION OF THE EMBODIMENTS

Embodiments according to the present invention will be explained in detail below with reference to the accompanying drawings.

Note that the embodiments explained below are examples for implementing the present invention and should be appropriately modified or changed in accordance with the arrangement of an apparatus to which the present invention is applied or with various conditions, so the present invention is not limited to the following embodiments.

First Embodiment

Figure 1:
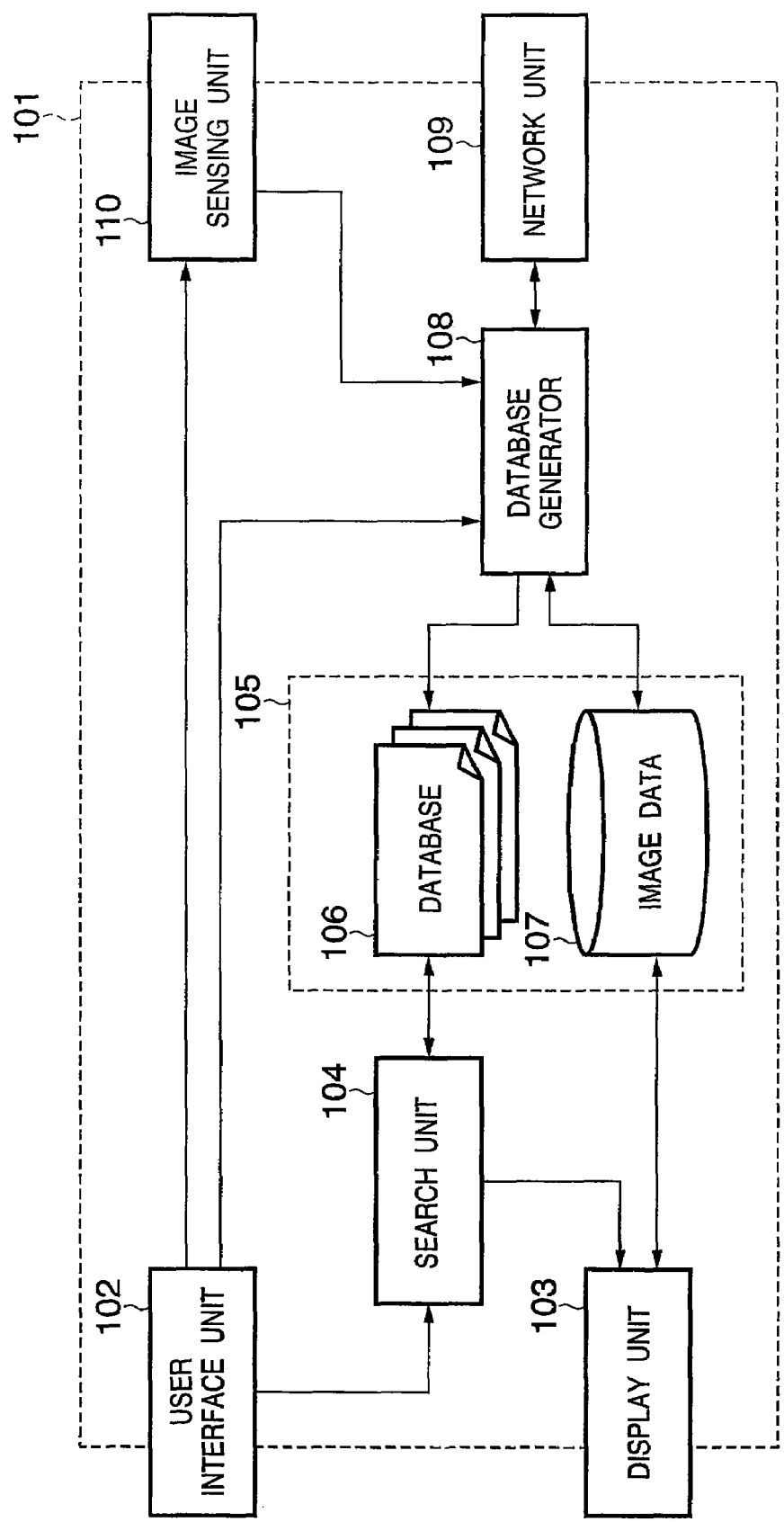
FIG. 1 is a block diagram showing the internal arrangement of a digital camera of the first embodiment according to the present invention.

FIG. 1 is a functional block diagram of a digital camera of an embodiment according to the present invention.

In FIG. 1, reference numeral 101 denotes a digital camera; 102, a user interface unit which accepts requests for a photographing process, database generating process, or search process from a user; 103, a display unit which displays images, a menu window for prompting a user to an operation, and the like; 104, a search unit which searches a database for desired image data by using a search key input from the user interface unit 102; and 105, a hard disk as a recording medium of the digital camera 101. In this embodiment, the hard disk 105 records a database 106 and image data 107. Reference numeral 106 denotes the database which manages meta data of each image data. Note that a detachable memory card or optical disk drive can also be used instead of (or together with) the hard disk 105.

FIG. 2 is a view showing an example of the configuration of data stored in the database 106.

Referring to FIG. 2, all data stored in the database 106 are described as texts. Image data are arrayed in the vertical (column) direction, and meta data of the image data are arranged in the horizontal (row) direction.

Reference numeral 201 denotes an ID for identifying each image data, i.e., an identifier which uniquely indicates image data; 202, a flag which indicates whether meta data generated by a server as will be described later is described; 203, a path which is position information of image data managed by a file system (not shown) in the digital camera 101; 204, meta data indicating the type, i.e., indicating whether image data is motion image data or still image data; 205, meta data indicating the photographing date/time, i.e., indicating information of the date/time of photographing and generation of image data; and 206, meta data indicating whether image data is a person image or landscape image. The meta data 206 indicates a person image if image data contains a person, and a landscape image if not. Reference numeral 207 denotes meta data concerning a color. The meta data 207 indicates color information of image data, and describes the name of a corresponding color in the CSV (Comma Separated Values) form. Reference numeral 208 denotes meta data concerning the weather. The meta data 208 describes information of the weather when image data was photographed. Note that the configuration of the database 106 described above is an example and is not limited to this example. Note also that the database 106 need not contain all the meta data shown in FIG. 2, i.e., need only contain at least some of them.

Figure 3:
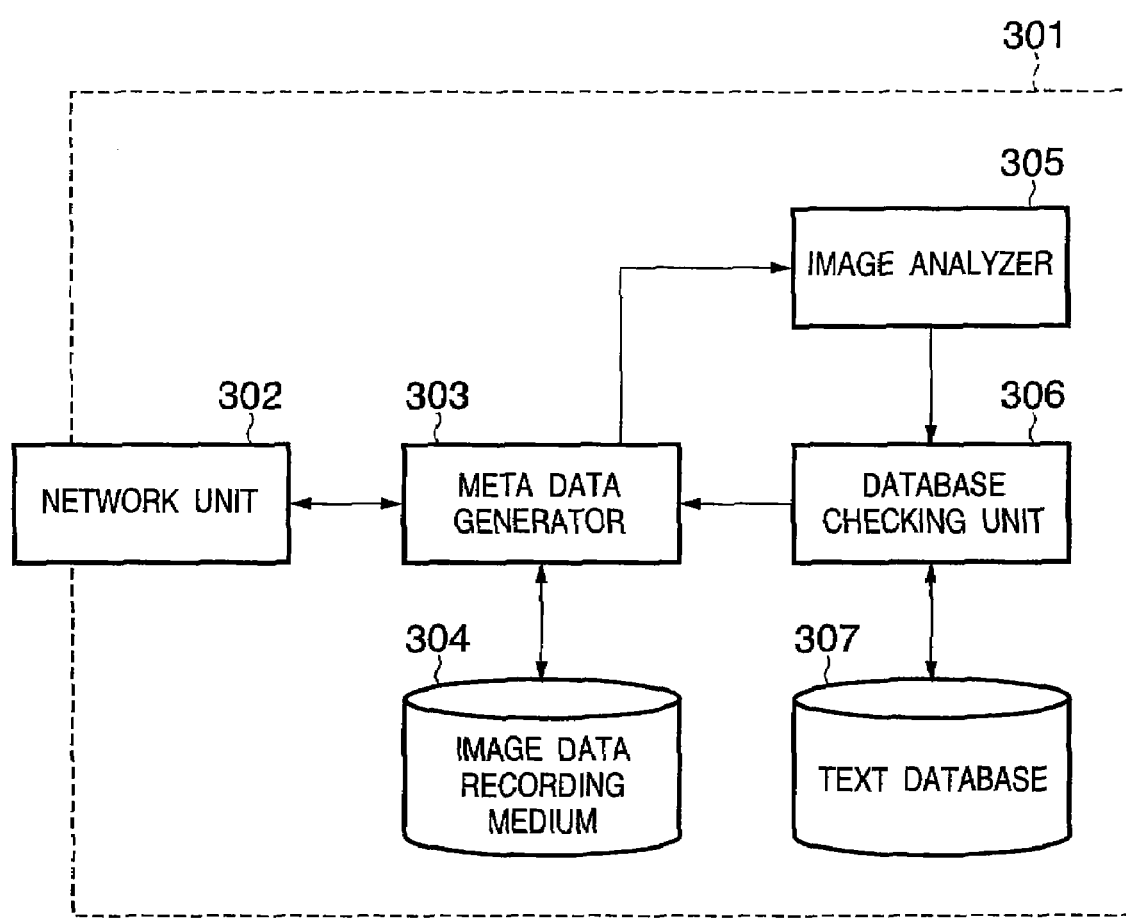
FIG. 3 is a block diagram showing the internal arrangement of a server of the first embodiment according to the present invention.

Referring to FIG. 1 again, reference numeral 107 denotes the image data such as motion image data and still image data; 108, a database generator which generates or updates the database 106 with respect to the image data 107 in accordance with a request input from the user interface unit 102; 109, a network unit which communicates with an external server 301 shown in FIG. 3; and 110, an image sensing unit which performs photographing and generates image data in accordance with instructions from the user interface unit 102.

Although functional blocks of the digital camera 101 are not limited to those described above, an explanation of functional blocks other than those related to the present invention will be omitted.

FIG. 3 is a functional block diagram of the server of the embodiment according to the present invention.

In FIG. 3, reference numeral 301 denotes the external server; 302, a network unit which communicates with the digital camera 101; 303, a metadata generator which accepts and records image data transmitted from the digital camera 101, and comprehensively manages processes such as image analysis and database check for generating meta data; and 304, an image data recording medium which records image data transmitted from the digital camera 101.

Reference 305 denotes an image analyzer which analyzes image data and extracts the characteristic amount of the image; 306, a database checking unit which checks a text database (to be described below) by using the characteristic amount, and acquires text data based on the characteristic amount; and 307, the text database storing text data corresponding to the characteristic amount. In this embodiment, text data is prestored in the text database 307 as default data or by user registration. Note that each of the image data recording medium 304 and text database 307 is a hard disk drive, optical disk drive, or semiconductor memory device.

In this embodiment, the network unit 109 of the digital camera 101 and the network unit 302 of the server 301 have a communicating configuration using the HTTP (Hyper Text Transfer Protocol) as a communication protocol. Note that the present invention can of course transmit and receive control commands and data across a network by using not only the HTTP but also the FTP (File Transfer Protocol) or the like.

The internal arrangements of the digital camera 101 and server 301 of the first embodiment have been explained above.

Next, processing operations performed by the digital camera 101 and server 301 of the first embodiment will be explained below.

<Photographing Process>

First, a photographing process performed by the digital camera 101 of this embodiment will be explained with reference to FIG. 4.

If the user inputs a photographing request to the user interface unit 102 by pressing a photographing button or the like in S401 of FIG. 4, the user interface unit 102 requests the image sensing unit 110 to perform a photographing process. In this embodiment, motion image photographing and still image photographing are processed by different buttons (not shown). However, the present invention is not limited to this embodiment.

In S402, the image sensing unit 110 having received the photographing request from the user interface unit 102 performs a photographing process and generates image data. The image sensing unit 110 then transmits the image data to the database generator 108.

In S403, the database generator 108 generates initial data to be recorded in the database 106, and additionally records the initial data in the database 106 on the hard disk 105. The initial data are the meta data concerning the ID 201, FLAG 202, path 203, type 204, and photographing date/time 205 shown in FIG. 2.

The ID 201 is set to be a unique value in the database 106. The FLAG 202 is set to be "0" (zero). A FLAG "0" indicates a status in which no meta data generated by the server 301 has been described yet. The path 203 sets information of the position where the image data is recorded. The type 204 sets the type of the generated image data. The photographing date/time 205 sets information of the date/time at which the image sensing unit 110 generated the image data. The meta data concerning the person/landscape 206, color 207, and weather 208 shown in FIG. 2 are generated by the server 301, and hence are not generated as the initial data.

In step S404, the database generator 108 records the image data generated by the image sensing unit 110 on the hard disk 105. In this case, the image data may also be recorded on the hard disk 105 via the file system (not shown). Note that the address where the image data is recorded is the position information represented by the path 203.

FIG. 5 is a view showing an example of the internal configuration of the database when the photographing process described above is performed and three new image data are generated.

Referring to FIG. 5, the IDs of the three newly generated image data are 00000007, 00000008, and 00000009. The FLAGs of these image data are 0, and the initial data of the database are described.

<Image Data Transmitting Process>

An image data transmitting process performed by the digital camera 101 of this embodiment will be explained below with reference to FIG. 6.

Figure 6:
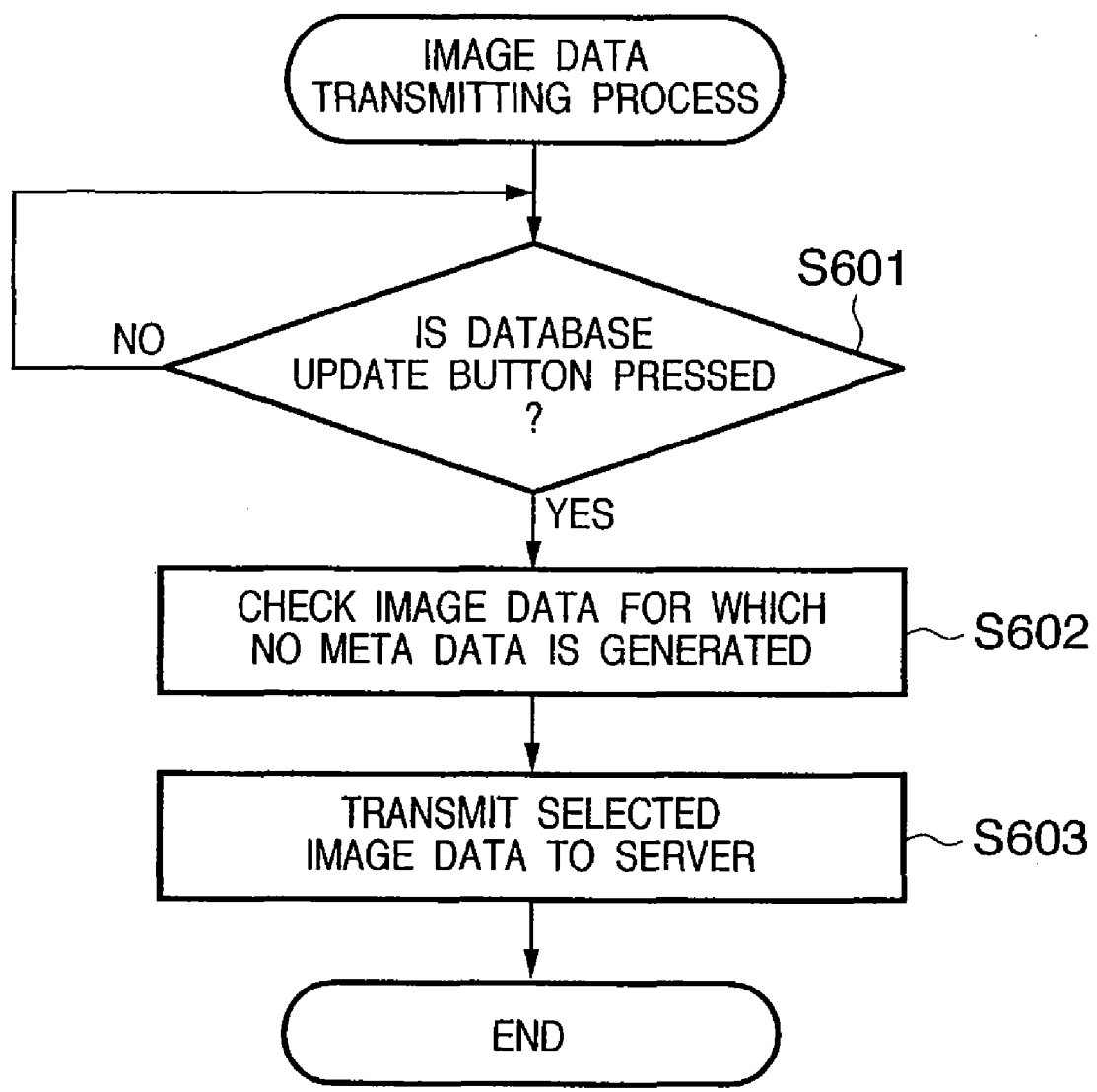
FIG. 6 is a flowchart showing an image data transmitting process performed by the digital camera of the first embodiment.

In S601 of FIG. 6, the user inputs a database updating request to the user interface unit 102 by, e.g., touching a database update button in the menu window. The user interface unit 102 notifies the database generator 108 of a meta data generation request.

In S602, the database generator 108 checks image data whose FLAG is 0 (zero) in the database 106.

In S603, the database generator 108 selectively reads out image data whose FLAG is 0 (zero) in S602, i.e., MOV_0002. MPG, IMG_0006. JPG, and IMG_0007. JPG shown in FIG. 5 from the image data 107 on the hard disk 105, and transmits these selected image data to the server 301 via the network unit 109.

This embodiment is based on the assumption that the digital camera 101 and server 301 are connected across a network in the image data transmitting process shown in FIG. 6. That is, this embodiment is based on the assumption that the digital camera 101 has detected the IP address of the server 301, the URLs (Uniform Resource Locators) of transmission destinations, and the like. Note that the present invention is not limited to this embodiment. For example, it is also possible to validate the network unit 109 when the meta data generation request is transmitted to the database generator 108 in S601, and connect to the server by detecting it in the network by using an automatic detection algorithm such as UPnP (Universal Plug and Play). The digital camera 101 may also connect to the server on the basis of the server IP address information preset in the digital camera 101.

<Meta Data Generating Process>

A meta data generating process performed by the server 301 of this embodiment will be explained below with reference to FIG. 7.

Figure 7:
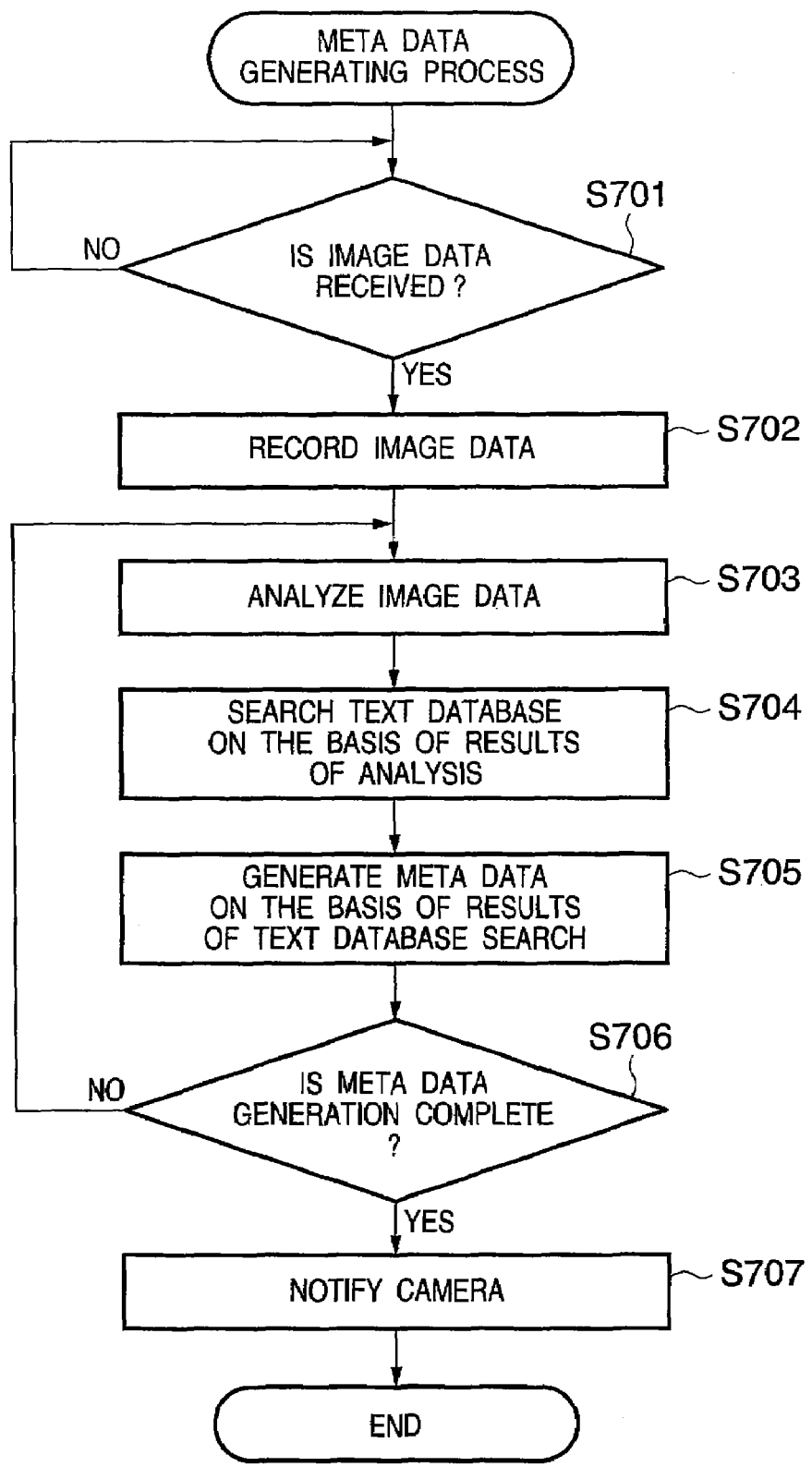
FIG. 7 is a flowchart showing a meta data generating process performed by the server of the first embodiment.

In S701 of FIG. 7, the network unit 302 receives the image data transmitted from the digital camera 101, and notifies the meta data generator 303 of the reception.

In S702, the meta data generator 303 records the received image data on the image data recording medium 304.

In S703, the image analyzer 305 analyzes the image data to be recorded on the image data recording medium 304, and calculates characteristic amount data of the image. More specifically, the image analyzer 305 uses the known image recognition technique and face image recognition technique to determine whether the image contains a face, extract a main color component contained in the image, and determine weather information on the basis of, e.g., the color component distribution and brightness of the image.

Note that various methods are known as the face detection technique. An example is a method using learning represented by a neural network. There is also a method of identifying portions, such as the eye, nose, mouth, and face contour, physical shapes from image data by using template matching. Still another example is a method which detects the characteristic amount such as the skin color or eye shape of image data and performs statistical analysis (e.g., Japanese Patent Laid-Open No. 10-232934 or 2000-48184). This embodiment performs a face identification process by a method which detects the pair of eyes (two eyes), nose, mouth, and face contour, and determines a person's face from their relative positions.

In S704, the database checking unit 306 searches the text database 307 for the corresponding meta data on the basis of the characteristic amount data calculated in S703.

In S705, the meta data generator 303 forms meta data to be returned to the digital camera 101 on the basis of the meta data obtained in S704.

In S706, the meta data generator 303 determines whether meta data are generated for all the image data requested by the digital camera 101. The meta data generator 303 repeats the processes in S703 to S705 until all meta data are generated.

FIG. 8 shows the configuration of the meta data returned from the server 301 when the metal data generating process is complete. The meta data generator 303 forms meta data which complements person/landscape 802, color 803, and weather 804 concerning each of the image data whose IDs 801 are 00000007, 00000008, and 00000009, and not yet described in the database 106 shown in FIG. 5.

In S707, the server 301 notifies the digital camera 101 that the requested meta data generating process is complete. This notification contains URL information for acquiring data to be returned. It is of course possible to perform this notification process by periodically acquiring the status of the server 301 by the digital camera 101, or by transmitting the notification from the server 301 to the digital camera 101.

<Meta Data Receiving Process>

A meta data receiving process performed by the digital camera 101 of this embodiment will be explained below with reference to FIG. 9.

Figure 9:
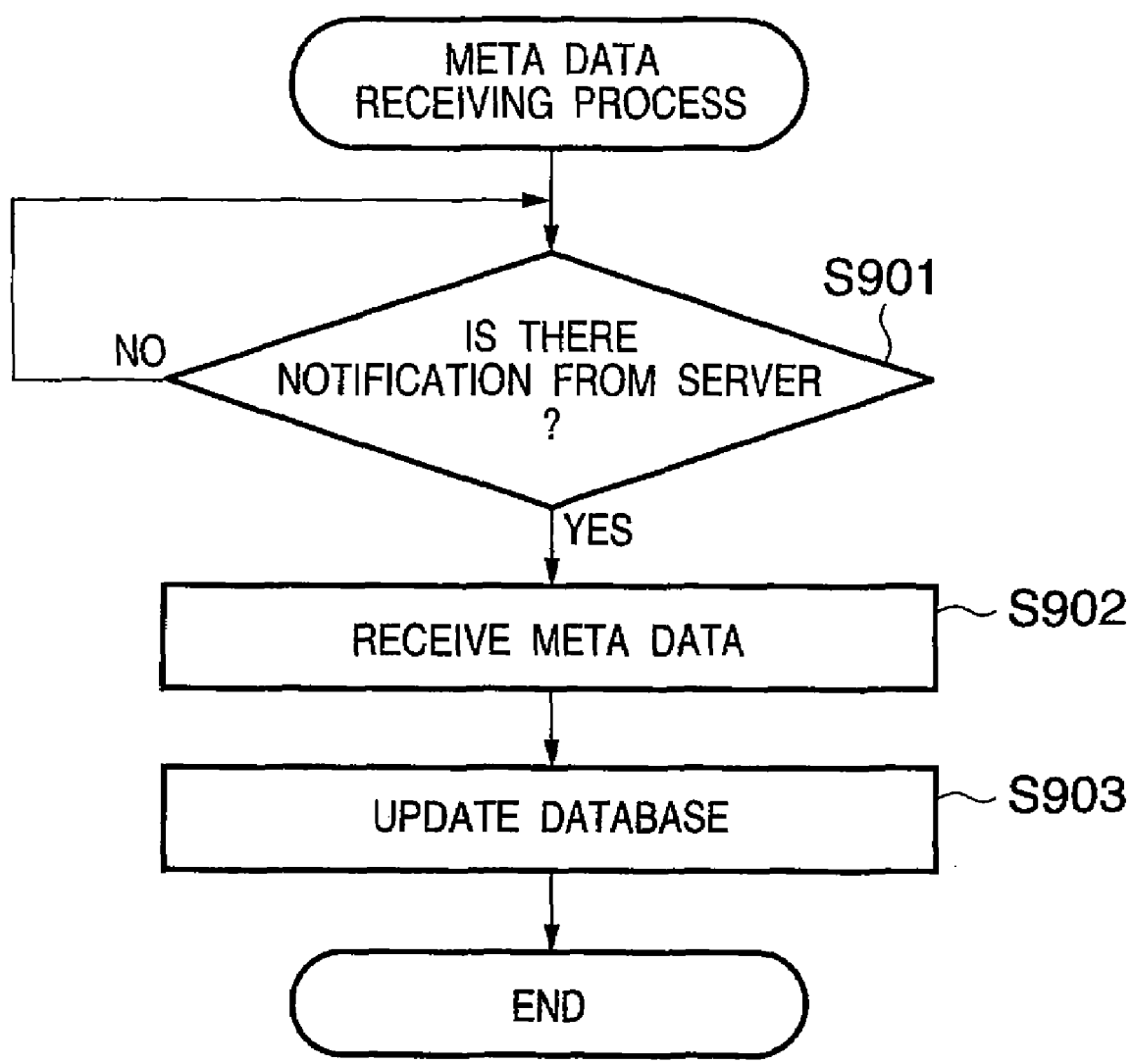
FIG. 9 is a flowchart showing a meta data receiving process performed by the digital camera of the first embodiment.

If the database generator 108 receives the meta data generating process completion notification from the server 301 via the network unit 109 in S901 of FIG. 9, the process advances to step S902, and the database generator 108 requests transmission of the meta data corresponding to the URL contained in the notification, and receives the meta data.

In S903, the database generator 108 adds the contents of the received meta data 802 to 804 to the database 106, and sets the FLAG of the changed rows to "1". A FLAG"1" indicates a status in which meta data generated by the server 301 has been described.

FIG. 10 shows an example of the configuration of the updated database 106. For each of the image data whose IDs are 00000007, 00000008, and 00000009, the contents of the meta data shown in FIG. 8, i.e., the person/landscape 802, color 803, and weather 804 are recorded in the database 106.

<Image Search/Display Process>

An image search/display process performed by the digital camera 101 of this embodiment will be explained below with reference to FIGS. 11 and 12.

Figure 12:
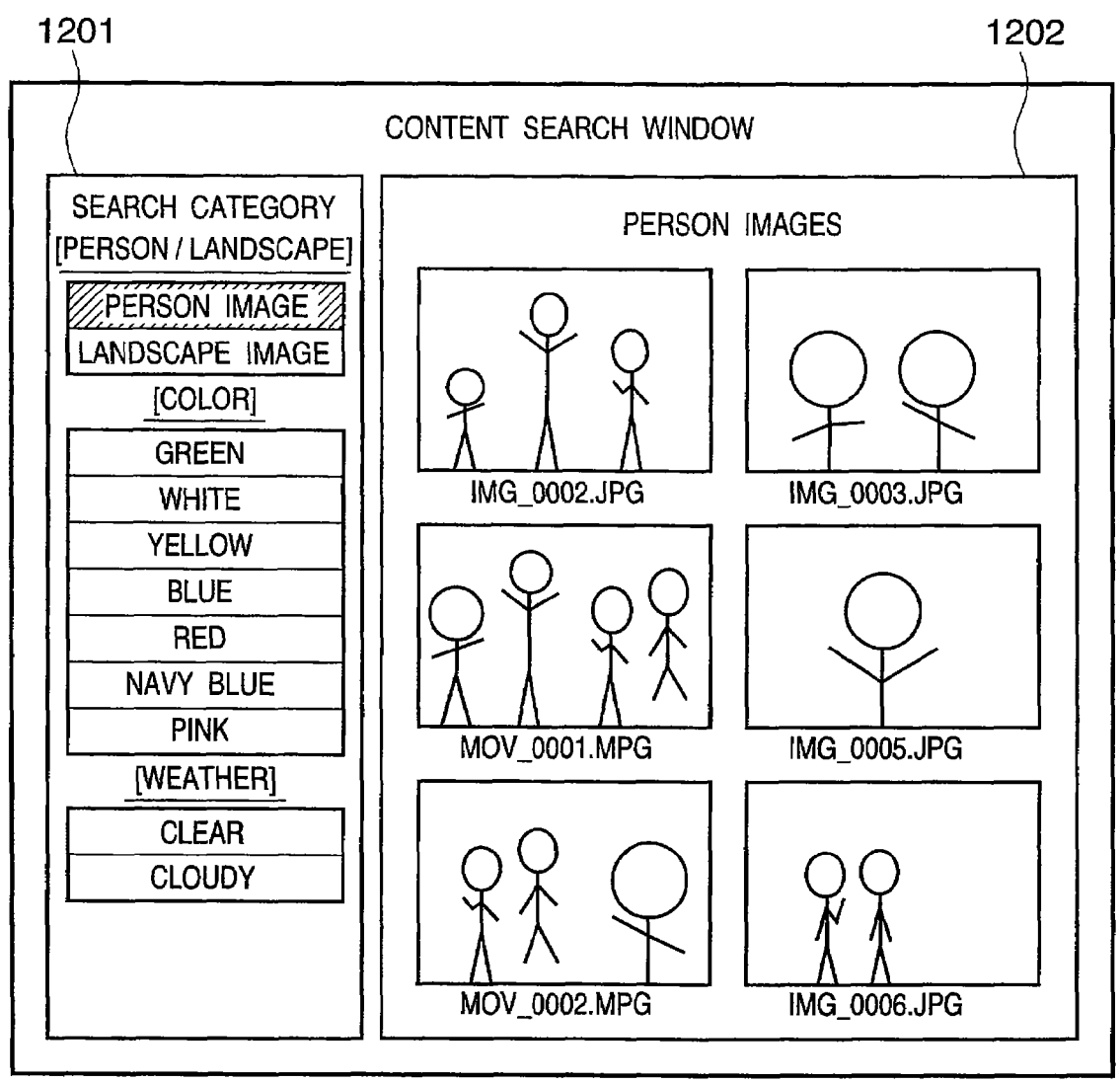
FIG. 12 is a view showing a search window of the digital camera of the first embodiment.

FIG. 12 shows a content search window. Reference numeral 1201 denotes a search category setting area; and 1202, a search result display area.

Figure 11:
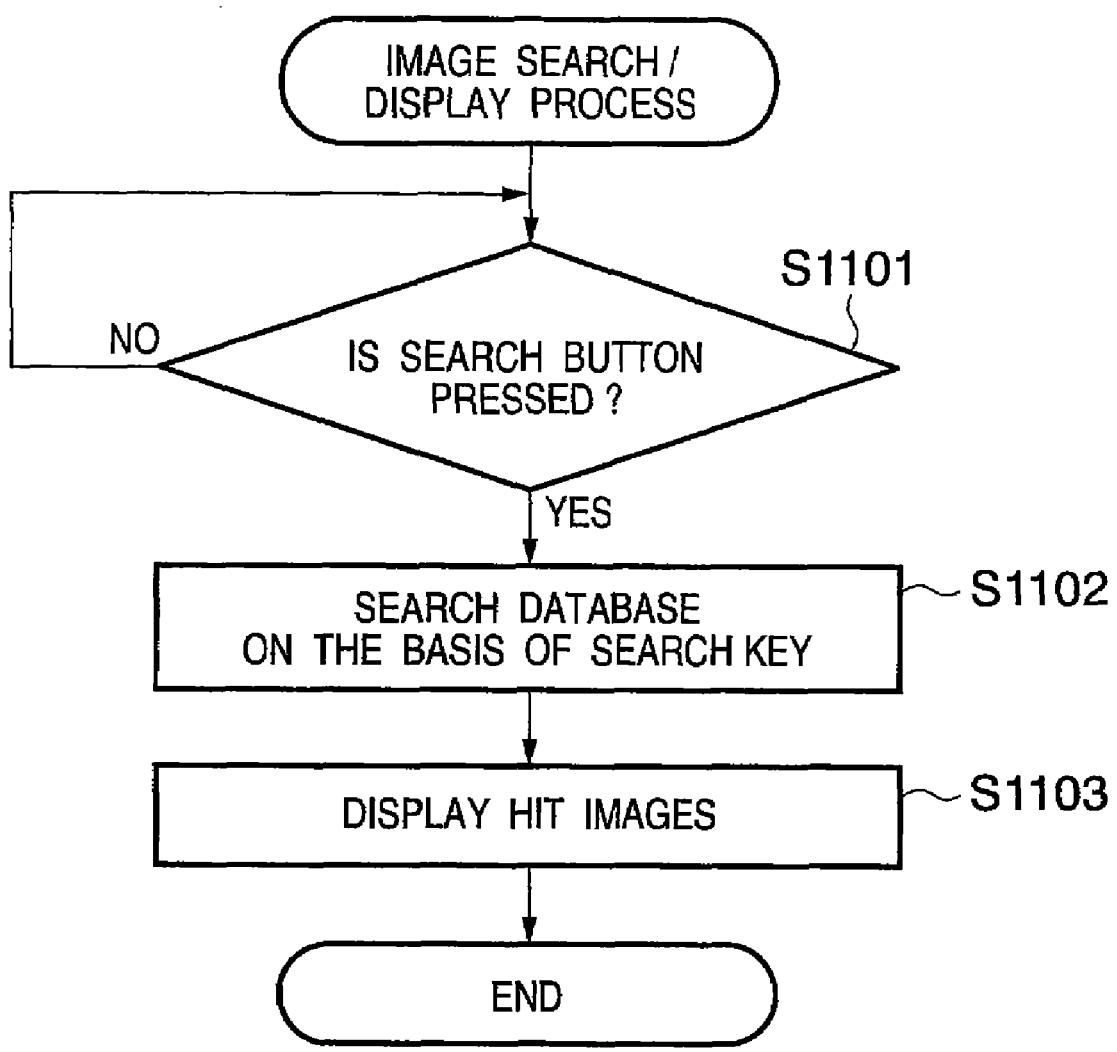
FIG. 11 is a flowchart showing an image search/display process performed by the digital camera of the first embodiment.

If the user selects a search category in the search category setting area 1201 and inputs a search request to the user interface unit 102 in S1101 of FIG. 11, the input search key is transmitted to the search unit 104.

In S1102, the search unit 104 searches the database 106 on the basis of the input search key by using the meta data. The search unit 104 transmits path information of image data hit by the search to the display unit 103.

In S1103, the display unit 103 accesses the hard disk 105 on the basis of the received path information, and displays a reproduced image of the image data hit by the search.

In the example of the content search window shown in FIG. 12, the search key input by the user is "person image", and the database shown in FIG. 10 is searched. In this case, image data whose IDs are 00000002, 00000003, 00000004, 00000006, 00000007, 00000008, and 00000009 are hit, and path information of these image data is transmitted to the display unit 103. The display unit 103 reproduces and displays reduced images of the hit image data as shown in FIG. 12. Note that if the image data is a motion image, a reduced image of a representative frame is displayed. In this manner, the display unit 103 can rapidly search for image data on the basis of the search key input by the user, and display the found image data. It is of course also possible to display the original reproduced image by designating a reduced image as a search result. Note that the hit image data corresponding to ID 00000009 is displayed by scrolling the window of FIG. 12.

The above embodiment can rapidly search the hard disk 105 for the desired image data 107 and display it, and can also reduce the processing load on the camera because the server 301 generates meta data from image data.

Second Embodiment

In the above first embodiment, the meta data generated by the meta data generator 303 of the server 301 are the person/landscape 802, color 803, and weather 804 shown in FIG. 8. In the second embodiment, the server 301 generates meta data which specifies a person, and an image which functions as a search key. Note that the arrangements of the digital camera and the server of this embodiment and a photographing process and image data transmitting process performed by the digital camera are the same as in the first embodiment, so an explanation thereof will be omitted.

The configuration of data stored in the database 106 will be explained below with reference to FIG. 13. Note that the same reference numerals as in the first embodiment shown in FIG.

2 denote the same data, and an explanation thereof will be omitted. Reference numeral 1301 denotes meta data of the number of persons contained in image data. If person/landscape 206 is "landscape", the number of persons 1301 is "0". Reference numeral 1302 denotes meta data of a person ID which is an identifier for specifying a person. The person IDs 1302 equal in number to the number of persons 1301 are described in the CSV form. Reference numeral 1303 denotes a search key image of a person corresponding to the person ID 1302. The search key image 1303 is displayed as a search key in a search window of the digital camera 101. The search key images 1303 equal in number to the number of persons 1301 are generated, and the image file names are described in the CSV form.

<Meta Data Generating Process>

Figure 14:
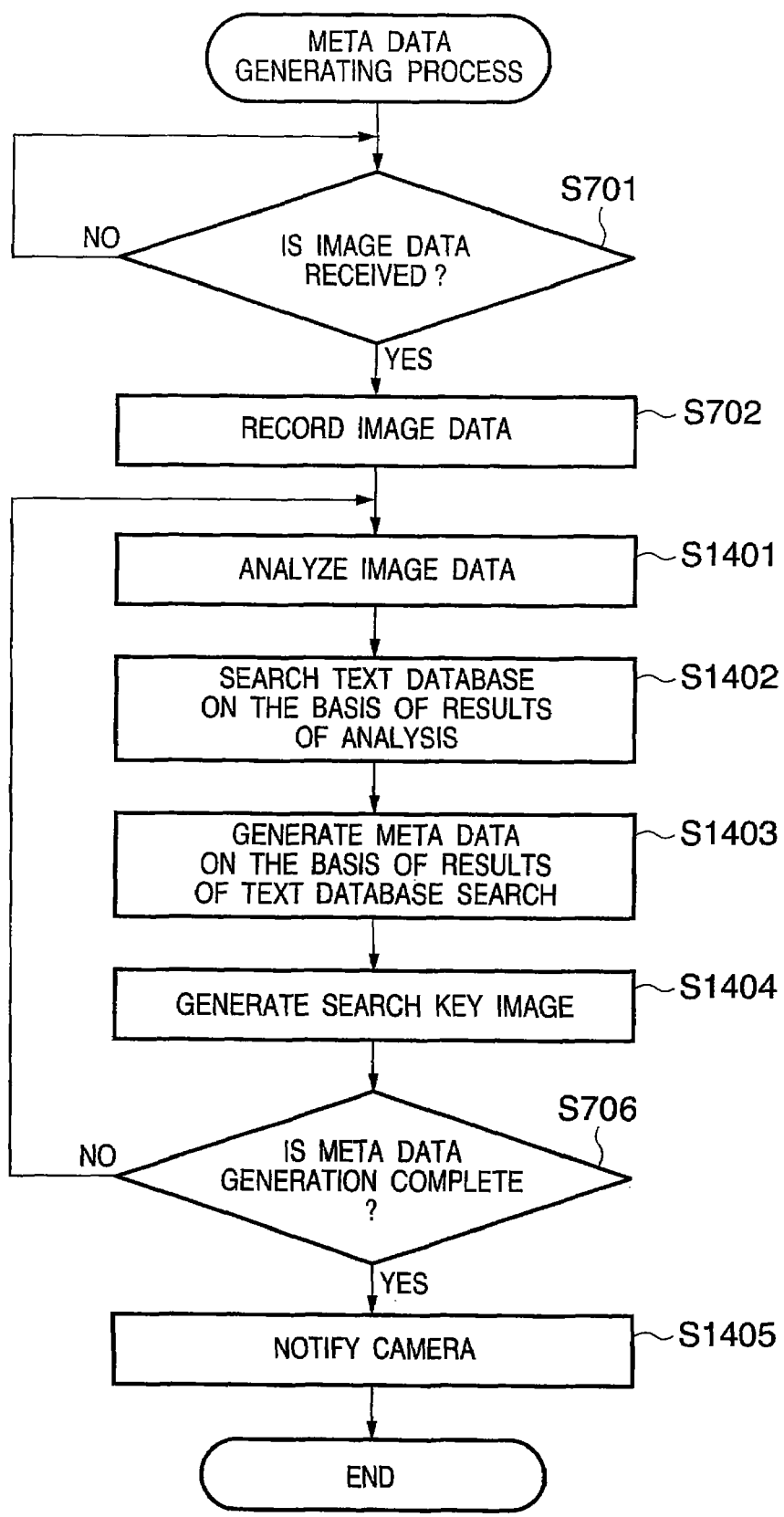
FIG. 14 is a flowchart showing a meta data generating process performed by a server of the second embodiment.

A meta data generating process of this embodiment will be explained below with reference to FIG. 14. Note that the same reference numerals as in the first embodiment shown in FIG. 7 denote the same steps, and an explanation thereof will be omitted.

In S1401, the image analyzer 305 analyzes image data to be recorded on an image data recording medium 304, and calculates characteristic amount data corresponding to the image. More specifically, the image analyzer 305 determines whether the image contains a face, determines the number of faces if the image contains them, and extracts characteristic amounts corresponding to these faces, by using the known face image recognition technique. The image analyzer 305 also extracts a main color component contained in the image, and determines weather information from the color component distribution and brightness of the image, as in the first embodiment.

In S1402, the database checking unit 306 searches a text database for corresponding meta data on the basis of the characteristic amount data calculated in S1401. That is, the database checking unit 306 searches the text database by using the characteristic amount data of the extracted face. If data is hit, the extracted face corresponds to a person ID already stored in the database, so data of the same face is already stored. If no data is hit, the extracted face is regarded as a new face, so a new ID is generated.

In S1403, the meta data generator 303 forms meta data to be returned to the digital camera 101 on the basis of the meta data obtained in S1402.

In S1404, a search key image is generated for the person ID detected in S1402. More specifically, only the face is cut out from the image data analyzed in S1401, and thumbnail-size face image data are formed in one-to-one correspondence with the types of person IDs hit in S1402 and/or newly formed person IDs. The file names of the formed image data are described in the meta data as return data.

FIG. 15 shows the configuration of the meta data returned from the server 301 when the meta data generating process is complete. Note that the same reference numerals as in the first embodiment shown in FIG. 8 denote the same items, and an explanation thereof will be omitted. Number of persons 1501 indicates that two faces (persons), three faces (persons), and one face (person) are respectively extracted from image data whose IDs 801 are 00000010, 00000011, and 00000012. The person IDs are A and B in the image data whose ID 801 is 00000010, B, C, and D in the image data whose ID 801 is 00000011, and C in the image data whose ID 801 is 00000012. That is, the image data whose IDs 801 are 00000010 and 00000011 contain the same person corresponding to B. The file name of a search key image 1503 for which the person ID is A is A. jpg, the file name of a search key image 1503 for which the person ID is B is B. jpg, and so on.

In S1405, the server 301 notifies the digital camera 101 that the requested meta data generating process is complete. This notification contains URL information for acquiring the meta data to be returned shown in FIG. 15, and URL data for acquiring a search key image main body. It is of course possible to perform this notification process by periodically acquiring the status of the server 301 by the digital camera 101, or by transmitting the notification from the server 301 to the digital camera 101.

<Meta Data Receiving Process>

Figure 16:
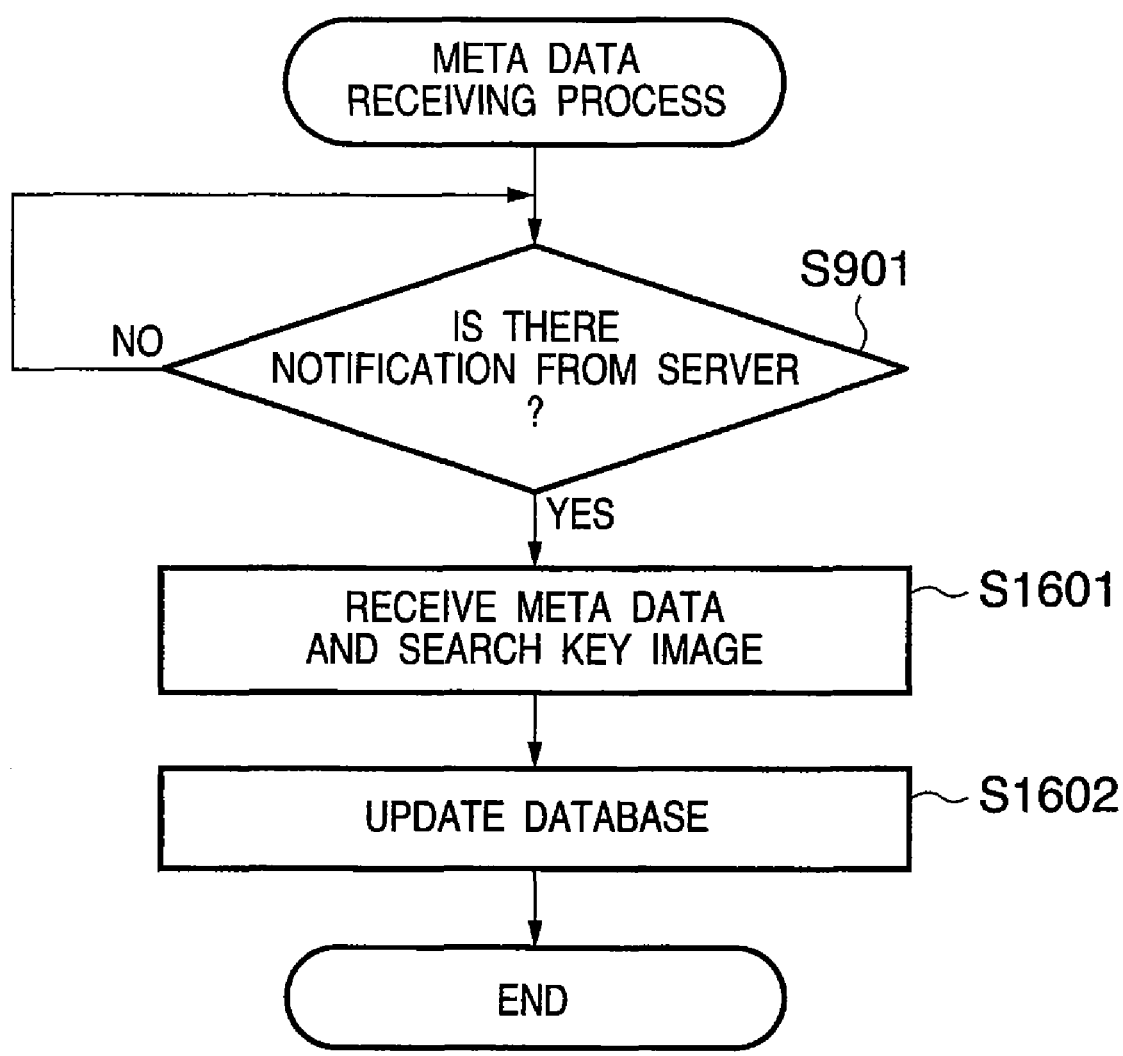
FIG. 16 is a flowchart showing a meta data receiving process performed by the server of the second embodiment.

A meta data receiving process performed by the digital camera 101 of this embodiment will be explained below with reference to FIG. 16. Note that the same reference numerals as in the first embodiment shown in FIG. 9 denote the same steps, and an explanation thereof will be omitted.

In S1601, the digital camera 101 requests transmission of the meta data corresponding to the URL contained in the notification from the server 301, and receives the meta data. If the meta data contains search key images, the digital camera 101 requests transmission of all the search key images, and acquires them.

In S1602, the database generator 108 adds the contents of the received meta data to the database 106, and sets the FLAG of the changed rows to "1". The received search key image is saved in a predetermined recording area of the hard disk 105.

FIG. 17 shows an example of the configuration of the updated database 106.

<Image Search/Display Process>

An image search/display process performed by the digital camera 101 of this embodiment will be explained below with reference to FIGS. 11, 18, and 19.

Figure 18:
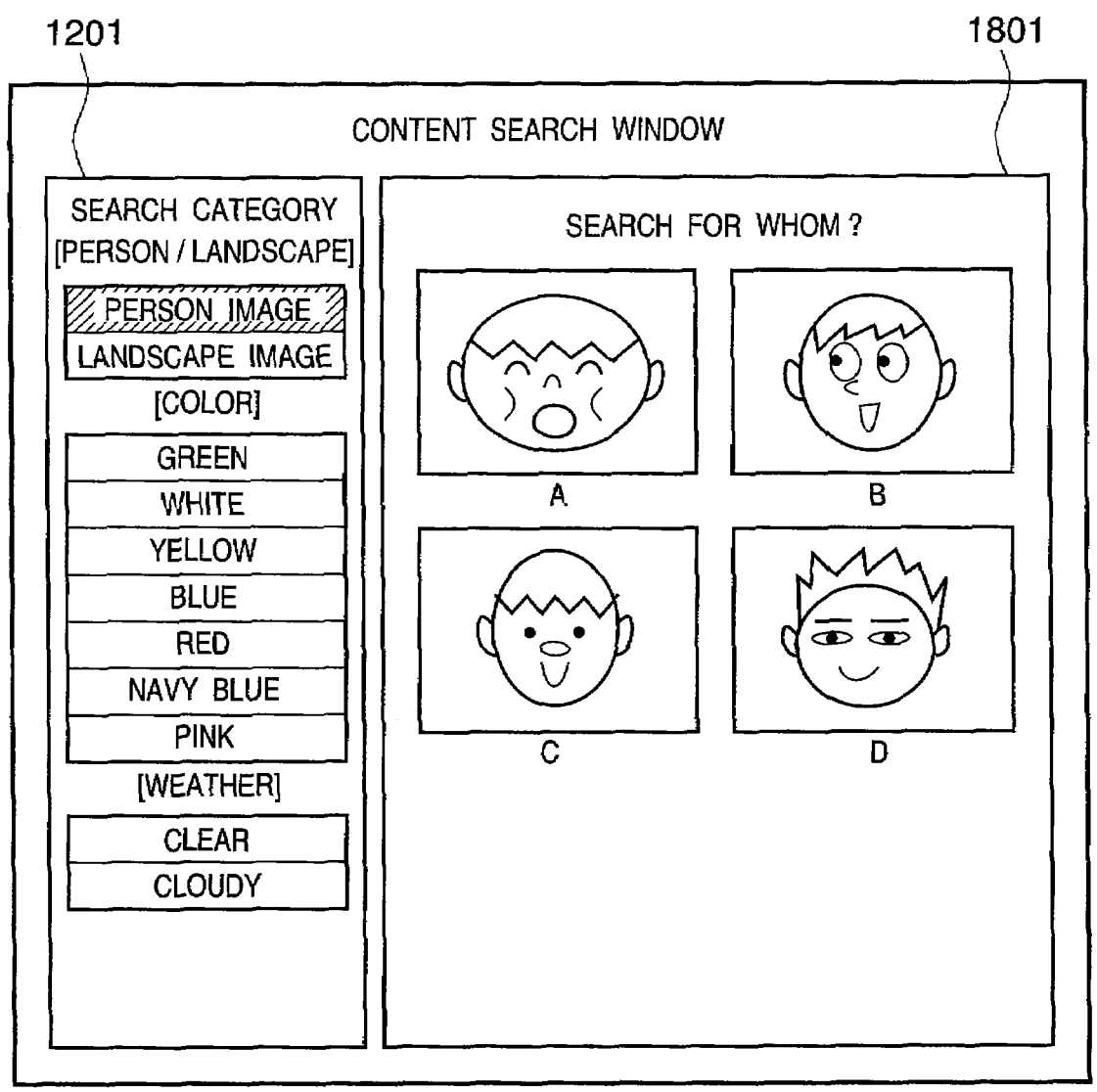
FIG. 18 is a view showing a search window of the digital camera of the second embodiment.

FIG. 18 shows a content search window, and reference numeral 1201 denotes a search category setting area. If the user has selected "person image" in [person/landscape], a selection window for selecting a face image to be searched for is displayed as indicated by 1801. The selection window 1801 displays the search key images corresponding to A. jpg, B. jpg, C. jpg, and D. jpg obtained from the server 301 in S1601 of FIG. 16.

If the user selects a desired face from these search key images in S1101 of FIG. 11, the person ID corresponding the selected search key image is transmitted to the search unit 104.

In S1102, the search unit 104 searches the database 106 on the basis of the input search key by using the meta data. For example, the search unit 104 searches for image data having the same person ID as the person ID corresponding to the selected search key image. The search unit 104 transmits path information of the image data hit by the search to the display unit 103. In S1103, the display unit 103 accesses the hard disk 105 on the basis of the received path information, and displays a reproduced image of the image data hit by the search.

Figure 19:
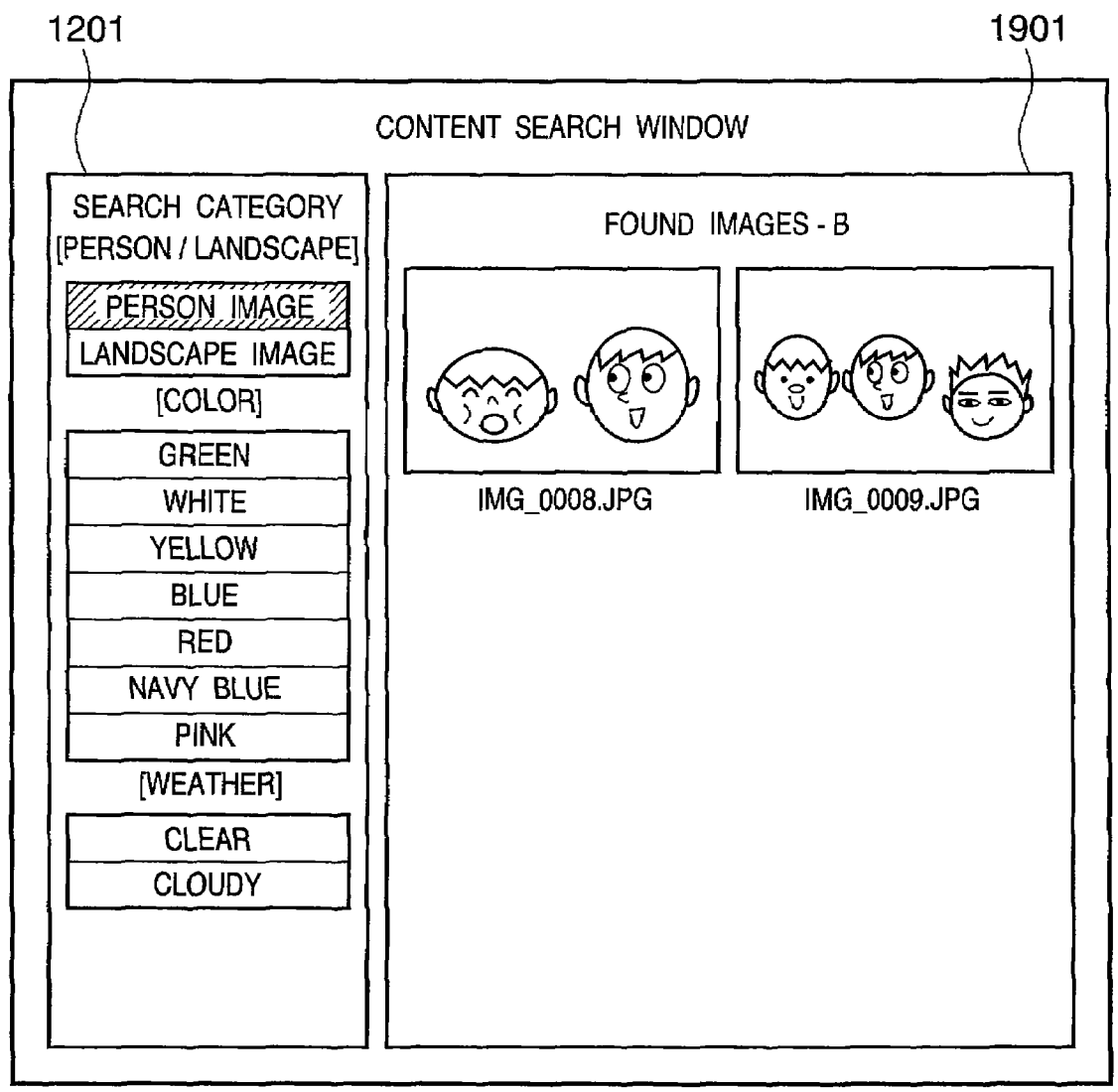
FIG. 19 is a view showing search results in the digital camera of the second embodiment.

FIG. 19 shows a window displaying search results when the user has selected the face B in FIG. 18. That is, the search unit 104 searches the database shown in FIG. 17 by using the person ID corresponding to the face B. Consequently, image data whose IDs are 00000010 and 00000011 are hit, and the path information of these image data is transmitted to the display unit 103. The display unit 103 reproduces and displays reduced images of the hit image data as indicated by 1901 in FIG. 19.

As described above, the display unit 103 can rapidly perform a face search process on image data on the basis of a face image search key input by the user and display the image data. It is of course also possible to display the original reproduced image by designating a reduced image as a search result.

Third Embodiment

In each of the first and second embodiments described above, the digital camera 101 asynchronously performs the photographing process and the process of transmitting image data to the server 301. By contrast, the third embodiment synchronously performs a photographing process and image data transmitting process. Note that the arrangements of the digital camera and server, the meta data generating process performed by the server, and the meta data receiving process and image search/display process performed by the digital camera are the same as in the first and second embodiments, so an explanation thereof will be omitted.

Processing by which the digital camera 101 of this embodiment synchronously performs a photographing process and image data transmitting process will be explained below with reference to FIG. 20.

Figure 20:
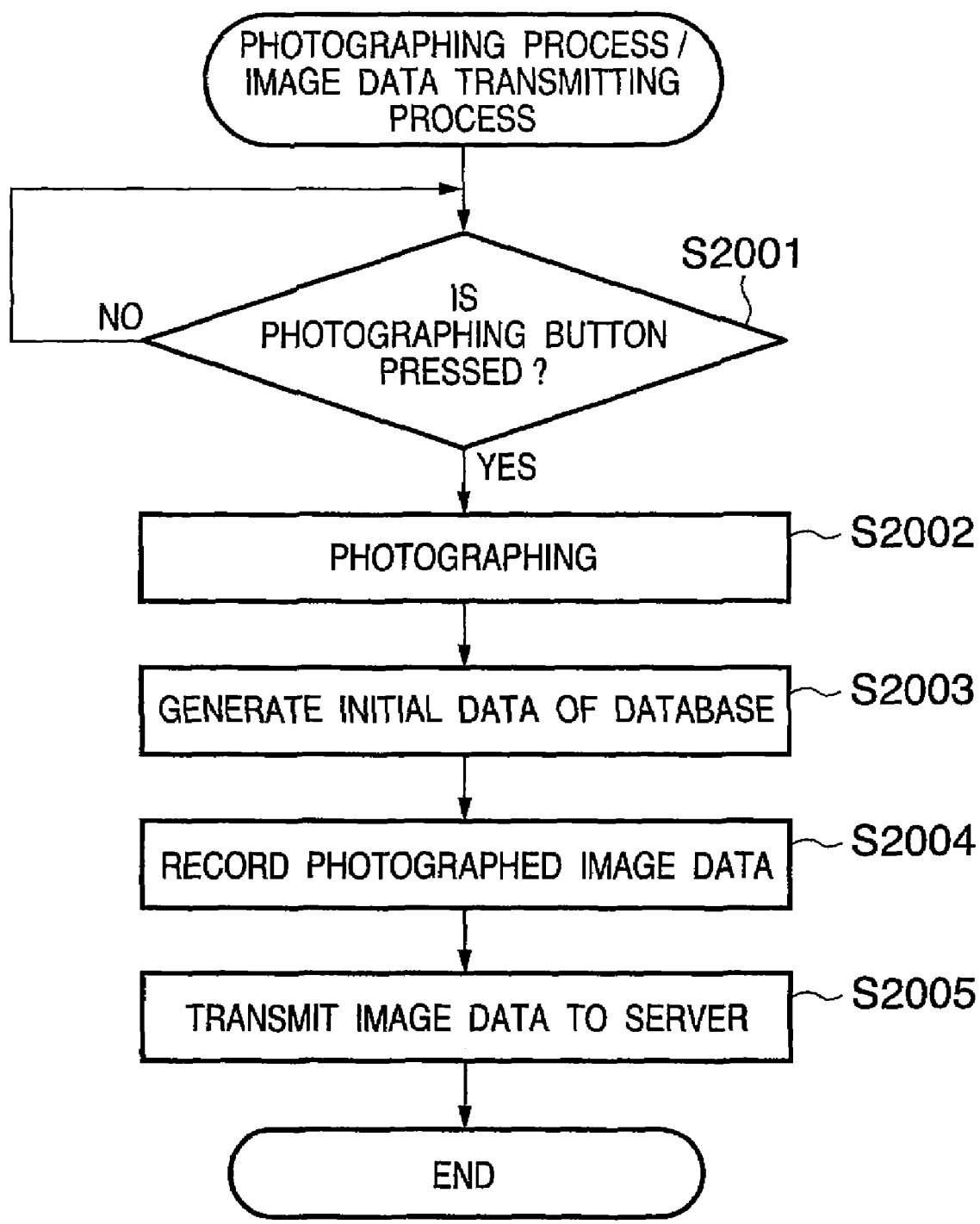
FIG. 20 is a flowchart showing a photographing process and image data transmitting process performed by the digital camera of the third embodiment.

If the user inputs a photographing request to the user interface unit 102 by, e.g., pressing a photographing button in S2001 of FIG. 20, the user interface unit 102 requests the image sensing unit 110 to perform a photographing process. This embodiment is also based on the assumption that motion image photographing and still image photographing are processed by different buttons.

In S2002, the image sensing unit 110 having received the photographing request generates image data by performing a photographing process, and transmits the image data to the database generator 108.

In S2003, the database generator 108 generates initial data to be recorded in the database 106, and additionally records the initial data in the database 106 on the hard disk 105.

In S2004, the database generator 108 records image data 107 on the hard disk 105. The image data 107 can also be recorded on the hard disk 105 via a file system (not shown). In S2005, the photographed image data is transmitted to the server 301.

Fourth Embodiment

In the first, second, and third embodiments described above, the digital camera 101 performs the image search/display process, and acquires meta data of a path corresponding to desired image data from the server 301. After that, the image data contained in the digital camera 101 is read out and displayed. In the fourth embodiment, however, image data is acquired from the server 301 on the basis of search results in the digital camera 101, and displayed. In this case, the digital camera 101 need not have any large-capacity hard disk drive or the like, and this decreases the packaging cost.

Note that only the characteristic points of the fourth embodiment will be explained below.

Figure 21:
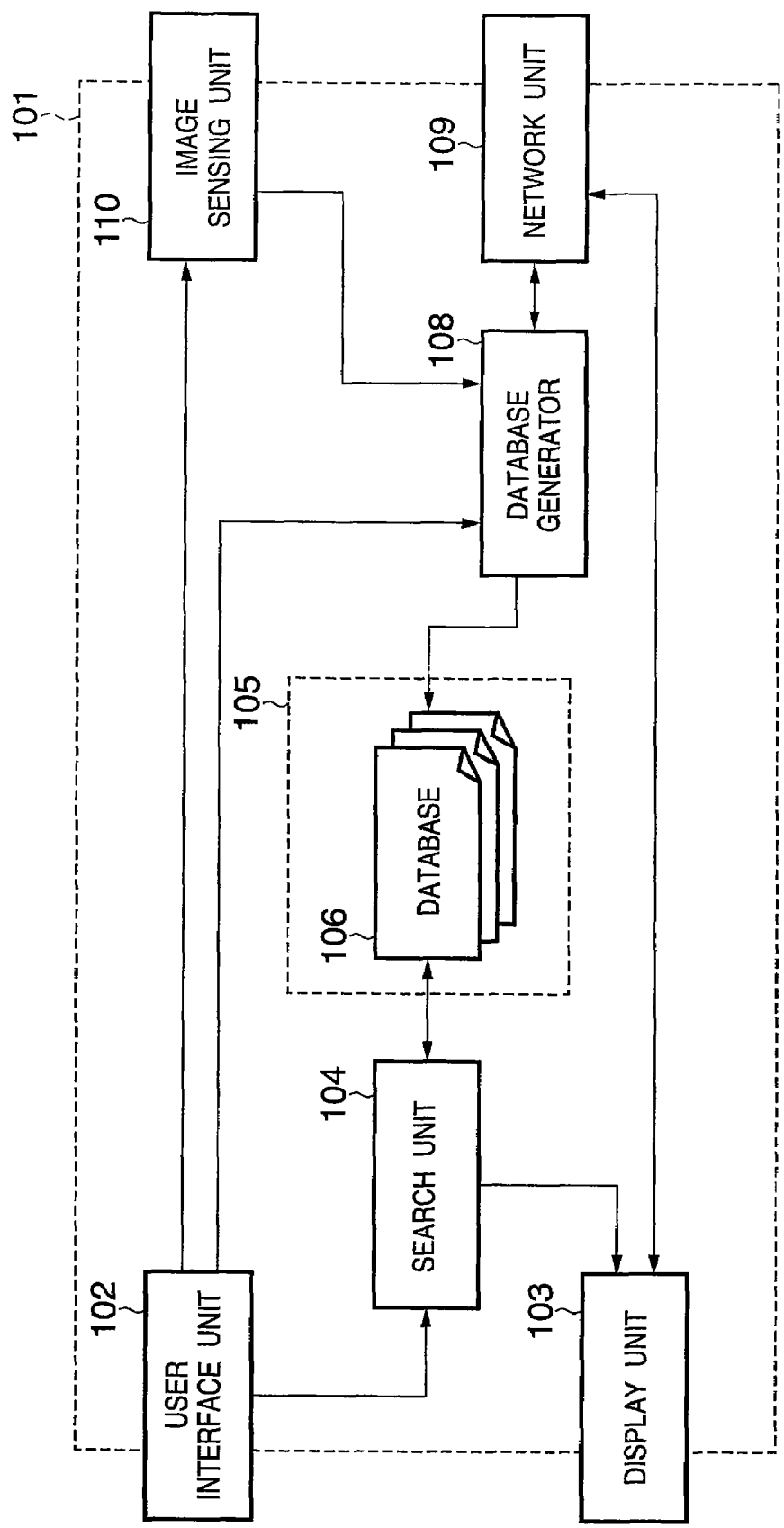
FIG. 21 is a block diagram showing the internal arrangement of the digital camera of the fourth embodiment.

FIG. 21 is a functional block diagram of the digital camera 101 of the fourth embodiment.

As is apparent from comparison with FIG. 1, the differences from the first, second, and third embodiments are that no image data 107 is recorded on the hard disk 105, and control and data communication are performed between the display unit 103 and network unit 109.

Figure 22:
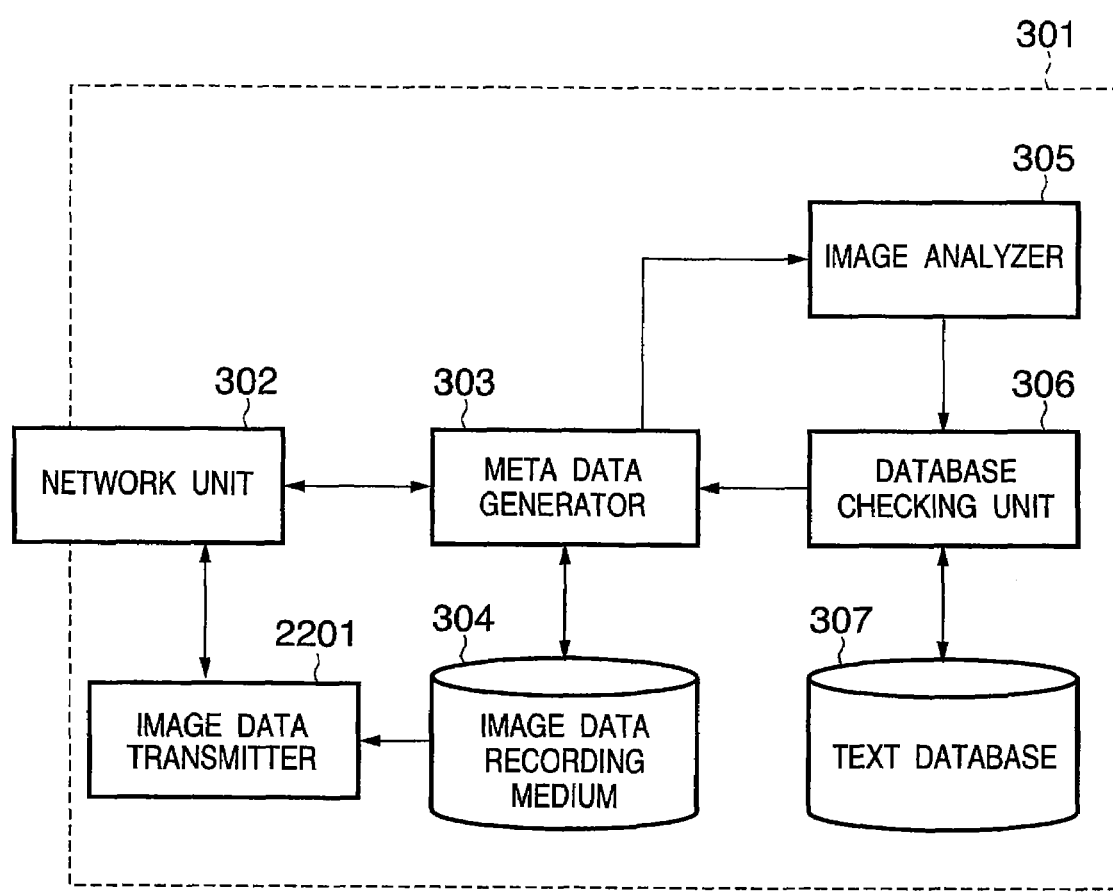
FIG. 22 is a block diagram showing the internal arrangement of a server of the fourth embodiment.

FIG. 22 is a functional block diagram of the server 301 of the fourth embodiment.

As is evident from comparison with FIG. 3, the difference from the first, second, and third embodiments is the addition of an image data transmitter 2201. In response to an image data acquisition request from the digital camera 101, the image data transmitter 2201 transmits image data corresponding to the designated URL to the digital camera 101.

Operation processes performed by the digital camera 101 and server 301 of the fourth embodiment will be explained below.

First, processing by which the digital camera 101 of this embodiment synchronously performs a photographing process and image data transmitting process will be explained with reference to FIG. 23.

Figure 23:
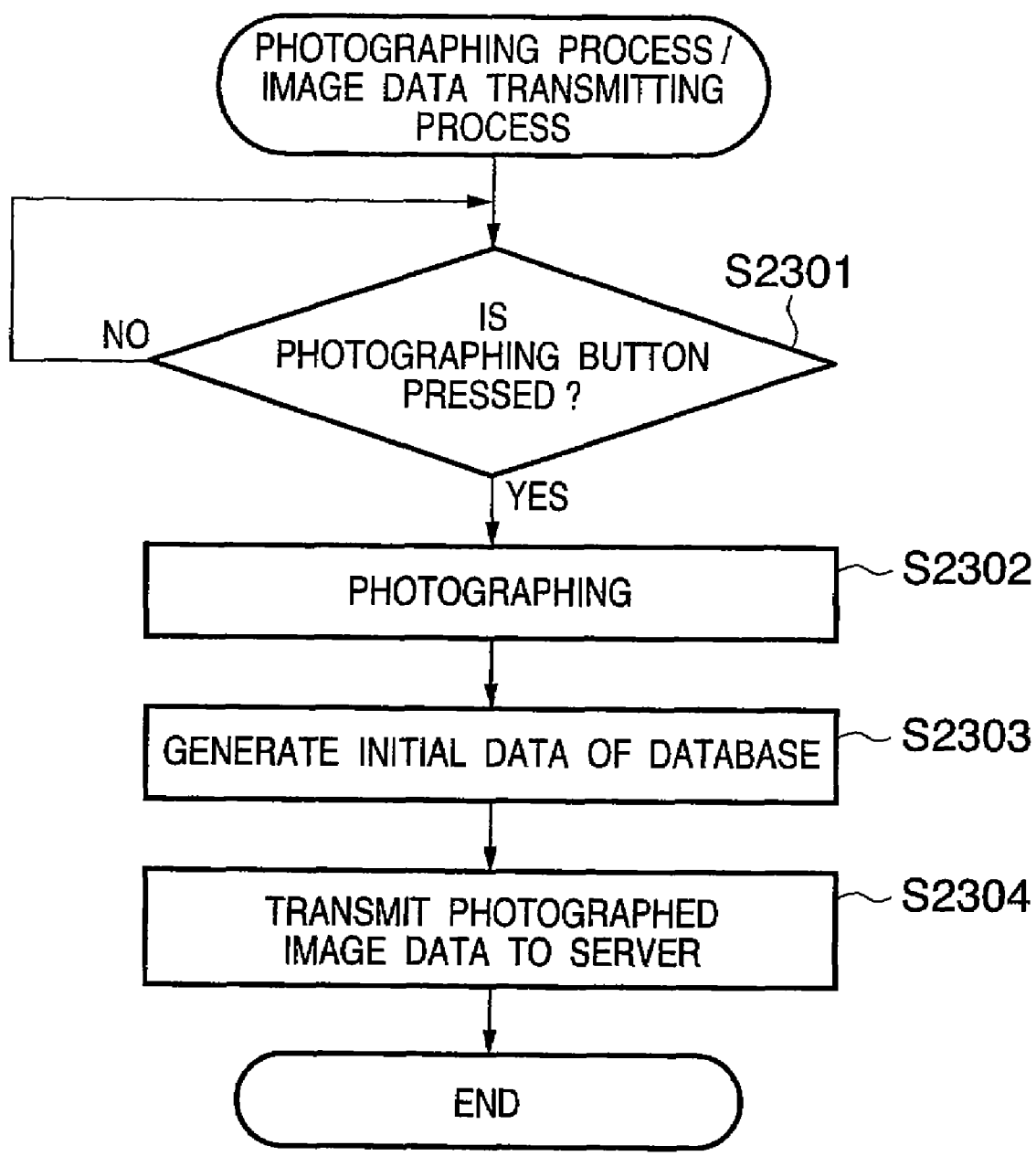
FIG. 23 is a flowchart showing a photographing process and image data transmitting process performed by the digital camera of the fourth embodiment.

If the user inputs a photographing request to the user interface unit 102 by, e.g., pressing a photographing button in S2301 of FIG. 23, the user interface unit 102 requests an image sensing unit 110 to perform a photographing process. This embodiment is also based on the assumption that motion image photographing and still image photographing are processed by different buttons.

In S2302, the image sensing unit 110 having received the photographing request generates image data by performing a photographing process, and transmits the image data to the database generator 108.

In S2303, the database generator 108 generates initial data to be recorded in the database 106, and additionally records the initial data in the database 106 on the hard disk 105.

In S2304, the database generator 108 transmits the image data to the server 301 via the network unit 109. Assume that in S2304, the storage destination (URL) in the server 301 of the image data transmitted by the digital camera 101 is designated beforehand. Alternatively, the server 301 having received the image data can return URL information indicating the storage destination to the digital camera 101. In either case, the image data storage destination (URL) in the server 301 is position information of the image data represented by the path described in the database 106.

A meta data generating process performed by the server 301 and a meta data receiving process performed by the digital camera 101 are the same as in the first and second embodiments, so an explanation thereof will be omitted.

Next, an image search/display process performed by the digital camera 101 of this embodiment will be explained below with reference to FIG. 24.

Figure 24:
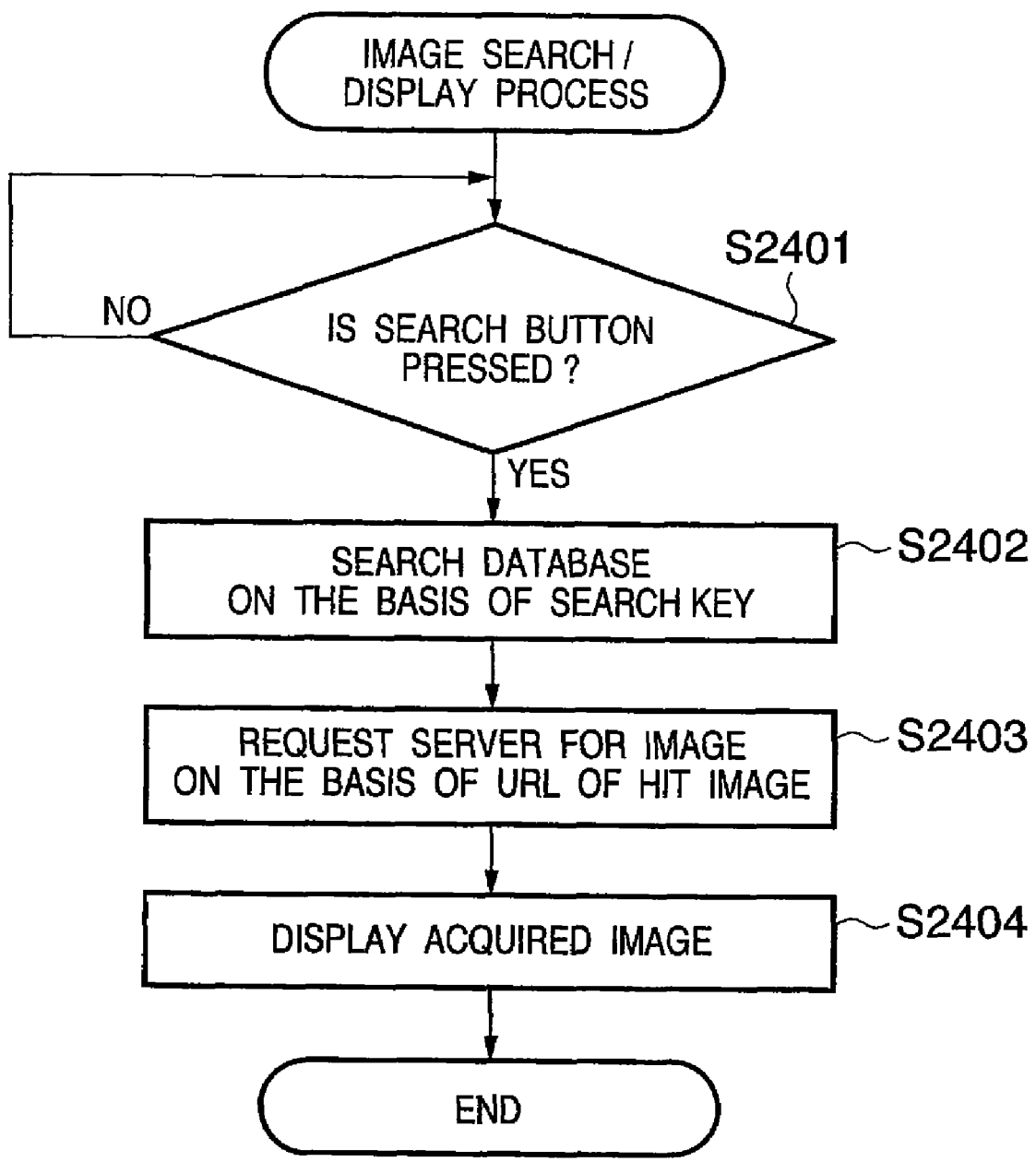
FIG. 24 is a flowchart showing an image search/display process performed by the digital camera of the fourth embodiment.

If the user inputs a search request to the user interface unit 102 by, e.g., pressing a search button in S2401 of FIG. 24, the input search key is transmitted to the search unit 104.

In S2402, the search unit 104 searches the database 106 on the basis of the input search key by using meta data. The search unit 104 transmits path information (URL) of image data hit by the search to the display unit 103.

In S2403, the display unit 103 transmits an image data acquisition request to the server 301 via the network unit 109 on the basis of the received path information (URL), and acquires the image data hit by the search.

In S2404, the display unit 103 displays a reproduced image of the received image data.

The above embodiment can perform the process of rapidly searching for desired image data from a huge number of image data and displaying the image data in the digital camera having limited resources.

Other Embodiments

The embodiments according to the present invention have been described in detail above by using the practical examples, but the present invention can take the form of an embodiment as, e.g., a system, apparatus, method, program, or storage medium (recording medium). More specifically, the present invention is applicable to a system comprising a plurality of devices, or an apparatus comprising a single device.

Also, it is naturally possible to achieve the object of the present invention regardless of which part of the functional blocks and operations shown in the drawings is implemented by a hardware circuit or software processing using a computer.

Note that the present invention can also be achieved by supplying a software program for implementing the functions of the above-mentioned embodiments to a system or apparatus directly or from a remote place. In this case, a computer of the system or the like reads out and executes the program code.

Accordingly, the program code itself installed in a computer to implement the functional processing of the present invention by the computer also implements the present invention. That is, the present invention includes the computer program itself for implementing the functional processing of the invention.

In this case, the program can take any form as long as it has the function of a program. Examples are an object code, a program executed by an interpreter, and script data to be supplied to an OS.

Examples of a recording medium (storage medium) for supplying the program are a flexible disk, hard disk, optical disk, and magnetooptical disk. Other examples are an MO, CD-ROM, CD-R, CD-RW, magnetic tape, nonvolatile memory card, ROM, and DVD (DVD-ROM and DVD-R).

The program can also be supplied by connecting to a homepage of the Internet by using the browser of a client computer, and downloading the computer program itself of the present invention from the homepage, or by downloading a compressed file containing an automatic installation function to a recording medium such as a hard disk. It is also possible to divide the program code forming the program of the present invention into a plurality of files, and download the individual files from different homepages. That is, the present invention also includes a WWW server which allows a plurality of users to download program files for implementing the functional processing of the present invention by a computer.

Furthermore, it is possible to encrypt the program of the present invention, distribute the encrypted program to users by storing the program in a storage medium such as a CD-ROM, and allow a user who has cleared predetermined conditions to download key information for decryption from a homepage across the Internet. In this case, the user implements the functional processing of the present invention by executing the encrypted program by using the downloaded key information, thereby installing the program in a computer.

The functions of the above embodiments may also be implemented by executing the readout program by a computer, or by causing an OS or the like running on the computer to perform part or the whole of actual processing on the basis of instructions by the program.

Moreover, it is possible to implement the functions of the above embodiments by writing the program read out from the recording medium in a memory of a function expansion board inserted into the computer or of a function expansion unit connected to the computer, and performing part or the whole of actual processing by a CPU or the like of the board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application Nos. 2006-048971, filed Feb. 24, 2006 and 2006-353182, filed Dec. 27, 2006, which are hereby incorporated by reference herein in their entirety.

What is claimed is:

1. A digital camera apparatus comprising:
   an image sensing unit adapted to sense an object image and generate image data;
   a generating unit adapted to generate a database related to each image data generated by said image sensing unit;
   a storage unit adapted to store the image data and the database in a common recording medium;
   a transmitting unit adapted to transmit the image data to a server;
   a receiving unit adapted to receive characteristic data of the image data from the server, the characteristic data being based on a result of at least person extraction performed on the image data;
   an updating unit adapted to update a part of the database stored in the common recording medium the characteristic data received from the server;
   a searching unit adapted to present the characteristic data as a search key such that the characteristic data can be designated by a user, and search the database so as to hit image data corresponding to the designated characteristic data; and
   a display unit adapted to display images based on the image data hit by said searching unit.

2. The apparatus according to claim 1, wherein the image data generated by said image sensing unit is synchronously recorded in the common recording medium and transmitted to the server.

3. The apparatus according to claim 1, wherein
   said display unit acquires the image data hit by said searching unit from the common recording medium, and displays the images.

4. The apparatus according to claim 1, wherein the characteristic data contains at least one of data representing a person, a landscape, a main color in an image, and weather extracted from the image data.

5. The apparatus according to claim 1, wherein said transmitting unit and said receiving unit perform a communication process complying with an Internet protocol with respect to the server.

6. The apparatus according to claim 1, wherein said receiving unit receives a search key image data together with the characteristic data from the server, the search key image data being based on the result of at least person extraction performed on the image data, and
   said searching unit presents the characteristic data and the search key image data as the search key such that the characteristic data and the search key image data can be designated by user.

7. A method of controlling a digital camera apparatus including an image sensing unit, the method comprising:
   an image sensing step of sensing an object image by the image sensing unit and generating image data;
   a generating step of generating a database related to each image data generated in said image sensing step;
   a storage step of storing the image data and the database in a common recording medium;
   a transmitting step of transmitting the image data to a server;
   a receiving step of receiving characteristic data of the image data from the server, the characteristic data being based on a result of at least person extraction performed on the image data;

an updating step of updating a part of the database stored in the common recording medium by the characteristic data;

a searching step of presenting the characteristic data as a search key such that the characteristic data can be designated by a user, and searching the database so as to hit image data corresponding to the designated characteristic data; and a display step of displaying images based on the image data hit by said searching step.

8. The method according to claim 7, wherein the image data generated in the image sensing step is synchronously recorded in the common recording medium and transmitted to the server.

9. The method according to claim 7, wherein
in the display step, the image data hit by said searching step is acquired from the common recording medium and displayed.

10. The method according to claim 7, wherein the characteristic data contains at least one of data representing a person, a landscape, a main color in an image, and weather extracted from the image data.

11. The method according to claim 7, wherein in the transmitting step and the receiving step, a communication process complying with an Internet protocol is performed with respect to the server.

12. The method according to claim 7, wherein in said receiving step, a search key image data are received together with the characteristic data from the server, the search key image data being based on the result of at least person extraction performed on the image data, and
in said searching step, the characteristic data and the search key image data are presented as the search key such that the characteristic data and the search key image data can be designated by user.

13. A digital camera apparatus comprising:
an image sensing unit adapted to sense an object image and generate image data;
a generating unit adapted to generate a database related to each image data generated by said image sensing unit;
a storage unit adapted to store the image data and the database in a common recording medium;
a transmitting unit adapted to selectively transmit the image data from the common recording medium to a server according to status of the database about the image data;
a receiving unit adapted to receive characteristic data generated by an analysis of the image data from the server;
an updating unit adapted to update a part of the database stored in the common recording medium by the characteristic data received from the server;
a searching unit adapted to present the characteristic data as a search key such that the characteristic data can be designated by a user, and search the database so as to hit image data corresponding to the designated characteristic data; and
a reproduction unit adapted to reproduce images based on the image data hit by said searching unit.

14. A method of controlling a digital camera apparatus including an image sensing unit, the method comprising:
an image sensing step of sensing an object image by the image sensing unit and generating image data;
a generating step of generating a database related to each image data generated in said image sensing step;
a storage step of storing the image data and the database in a common recording medium;
a transmitting step of selectively transmitting the image data from the common recording medium to a server according to status of the database about the image data;
a receiving step of receiving characteristic generated by an analysis of the image data from the server;
an updating step of updating a part of the database stored in the common recording medium by the characteristic data received from the server;
a searching step of presenting the characteristic data as a search key such that the characteristic data can be designated by a user, and searching the database so as to hit image data corresponding to the designated characteristic data; and
a reproduction step of reproducing images based on the image data hit in said searching step.

* * * * *